(12) United States Patent  
Sorgento

(10) Patent No.: US 10,978,992 B2  
(45) Date of Patent: Apr. 13, 2021

(54) MULTIPLE CONFIGURABLE SOLAR PHOTOVOLTAIC ASSEMBLY

(71) Applicant: Jerry Sorgento, Clarksburg, NJ (US)

(72) Inventor: Jerry Sorgento, Clarksburg, NJ (US)

(*) Notice: Subject to any disclaimer, the term of this patent is extended or adjusted under 35 U.S.C. 154(b) by 0 days.

(21) Appl. No.: 16/950,747

(22) Filed: Nov. 17, 2020

(65) Prior Publication Data

US 2021/0075367 A1 Mar. 11, 2021

Related U.S. Application Data

(63) Continuation of application No. 16/540,022, filed on Aug. 13, 2019, now Pat. No. 10,840,852, which is a continuation-in-part of application No. 16/059,318, filed on Aug. 9, 2018, now Pat. No. 10,381,975, which is a continuation of application No. 15/676,993, filed on Aug. 14, 2017, now abandoned, which is a continuation-in-part of application No. 14/827,372, filed on Aug. 17, 2015, now abandoned, which is a continuation-in-part of application No. 13/910,537, filed on Jun. 5, 2013, now abandoned.

(51) Int. Cl.
| | | |
|---|---|---|
| *H01L 31/042* | (2014.01) | |
| *H02N 6/00* | (2006.01) | |
| *H02S 30/20* | (2014.01) | |
| *F16M 11/42* | (2006.01) | |
| *H02S 30/10* | (2014.01) | |
| *F16M 11/10* | (2006.01) | |
| *H02S 40/34* | (2014.01) | |
| *H02S 99/00* | (2014.01) | |

(52) U.S. Cl.
CPC ............ *H02S 30/20* (2014.12); *F16M 11/10* (2013.01); *F16M 11/42* (2013.01); *H02S 30/10* (2014.12); *H02S 40/34* (2014.12); *H02S 99/00* (2013.01)

(58) Field of Classification Search
CPC ..................................................... H02S 40/34
See application file for complete search history.

(56) References Cited

U.S. PATENT DOCUMENTS

| | | | | |
|---|---|---|---|---|
| 7,762,832 B2* | 7/2010 | Minnick | ............... | H01R 13/111 439/374 |
| 2010/0275976 A1* | 11/2010 | Rubin | ................. | H01L 31/0508 136/251 |
| 2011/0140528 A1* | 6/2011 | Pasi | ........................ | H02S 40/36 307/77 |
| 2012/0312347 A1* | 12/2012 | Buettner | ................. | H02S 40/36 136/244 |

* cited by examiner

Primary Examiner — Angelo Trivisonno

(57) ABSTRACT

A portable multiple configuration solar photovoltaic assembly is disclosed. The assembly contains a plurality of photovoltaic modules that collect solar energy and convert the solar energy into electricity.

5 Claims, 43 Drawing Sheets

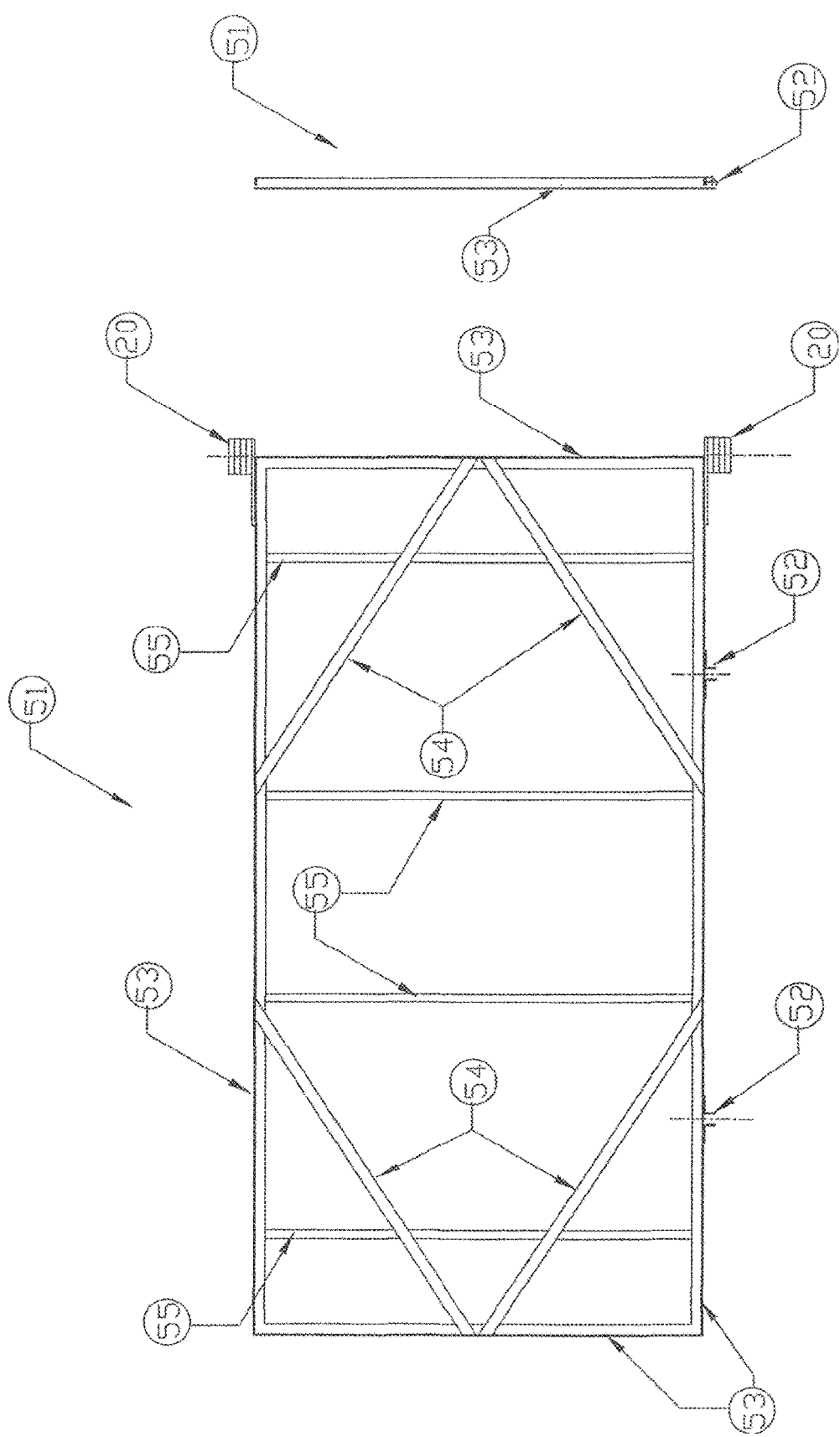

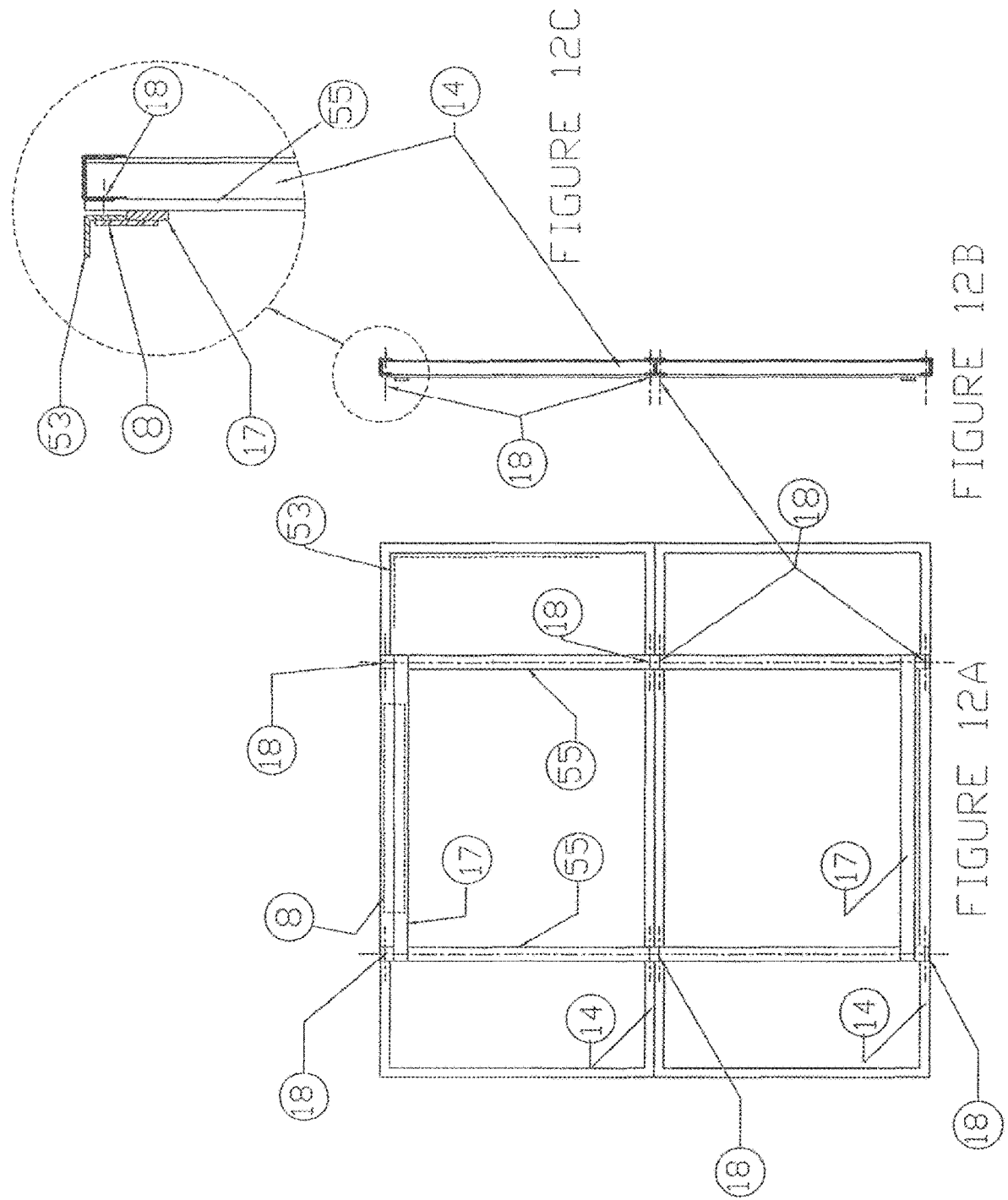

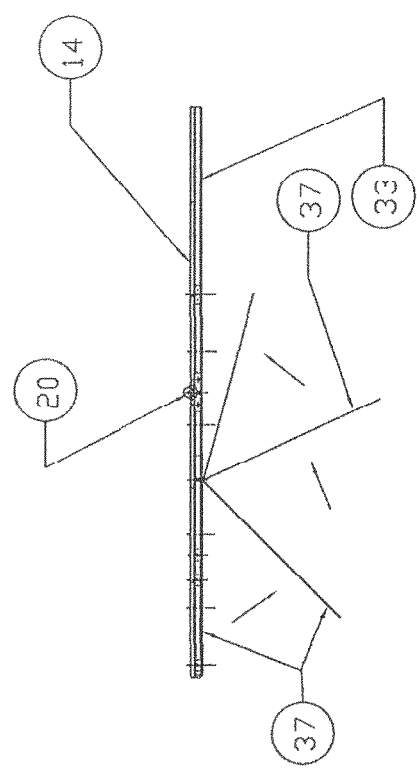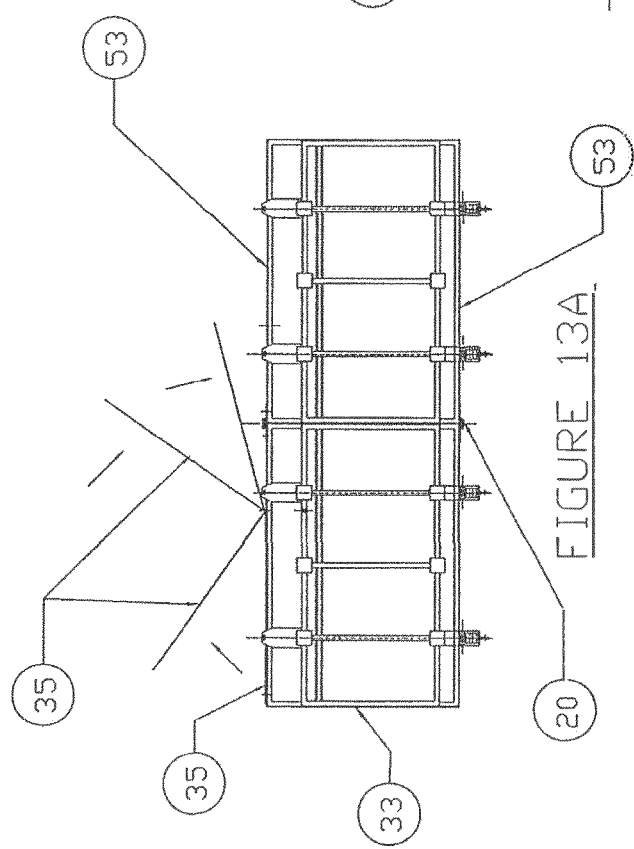

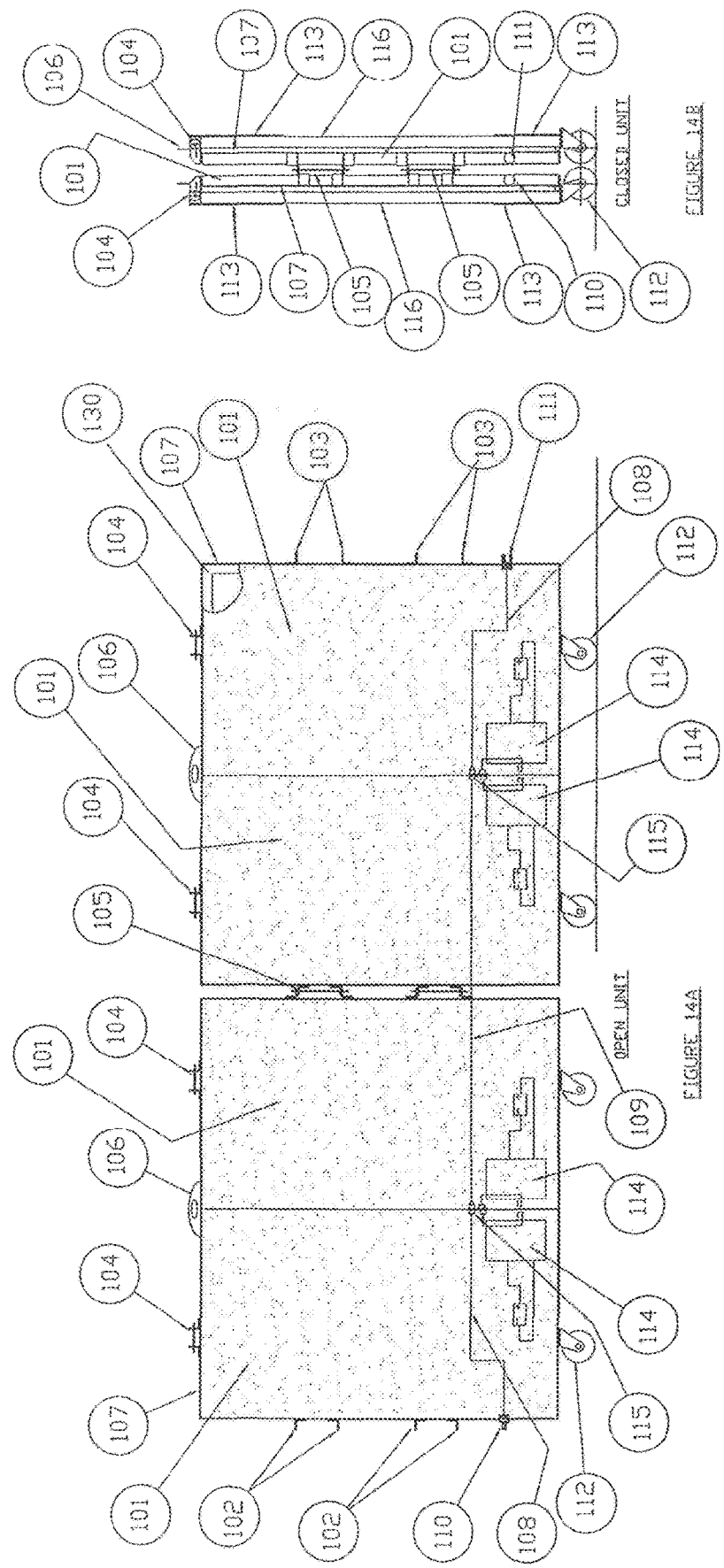

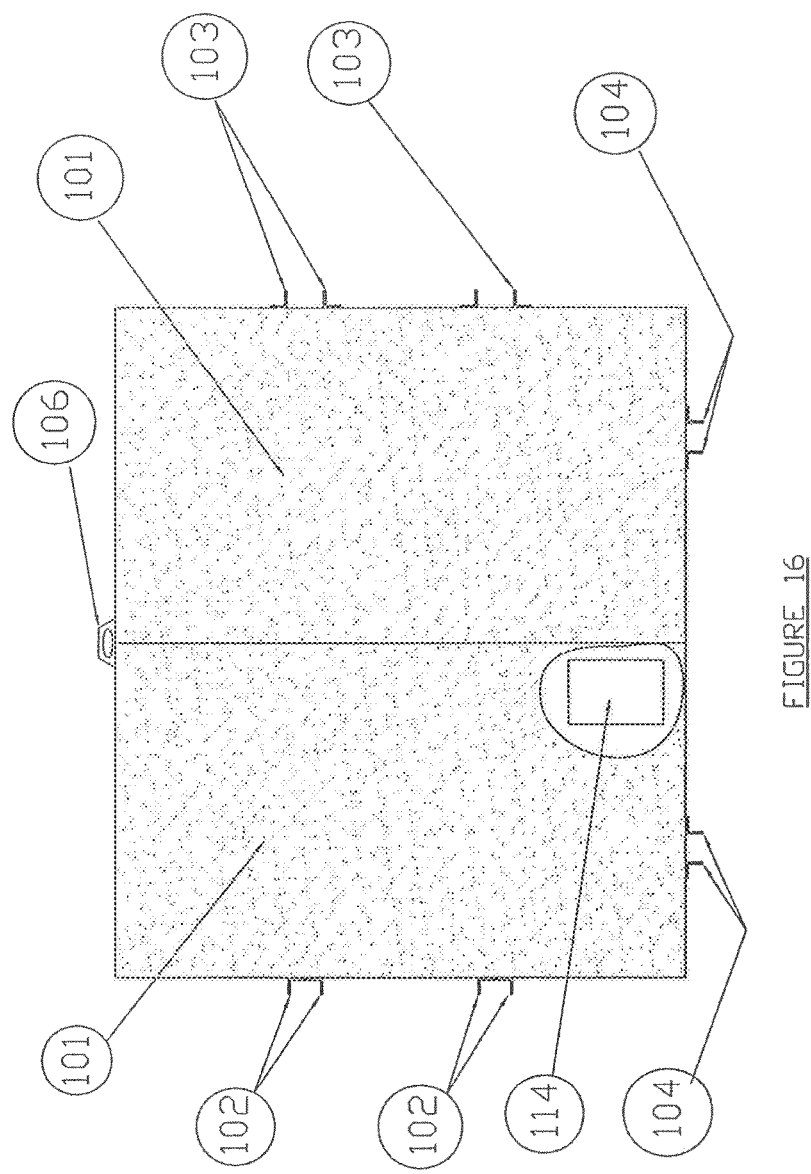

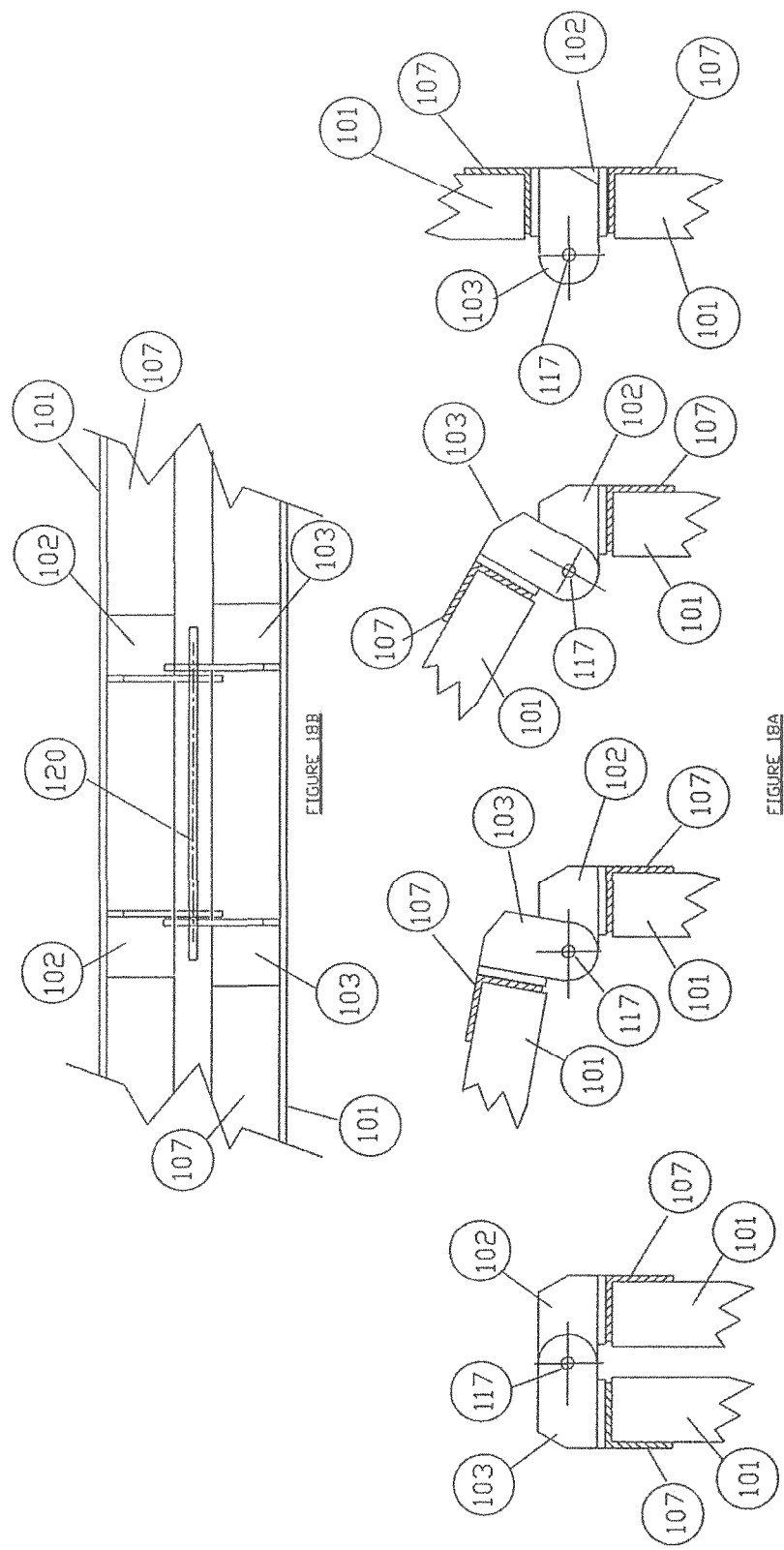

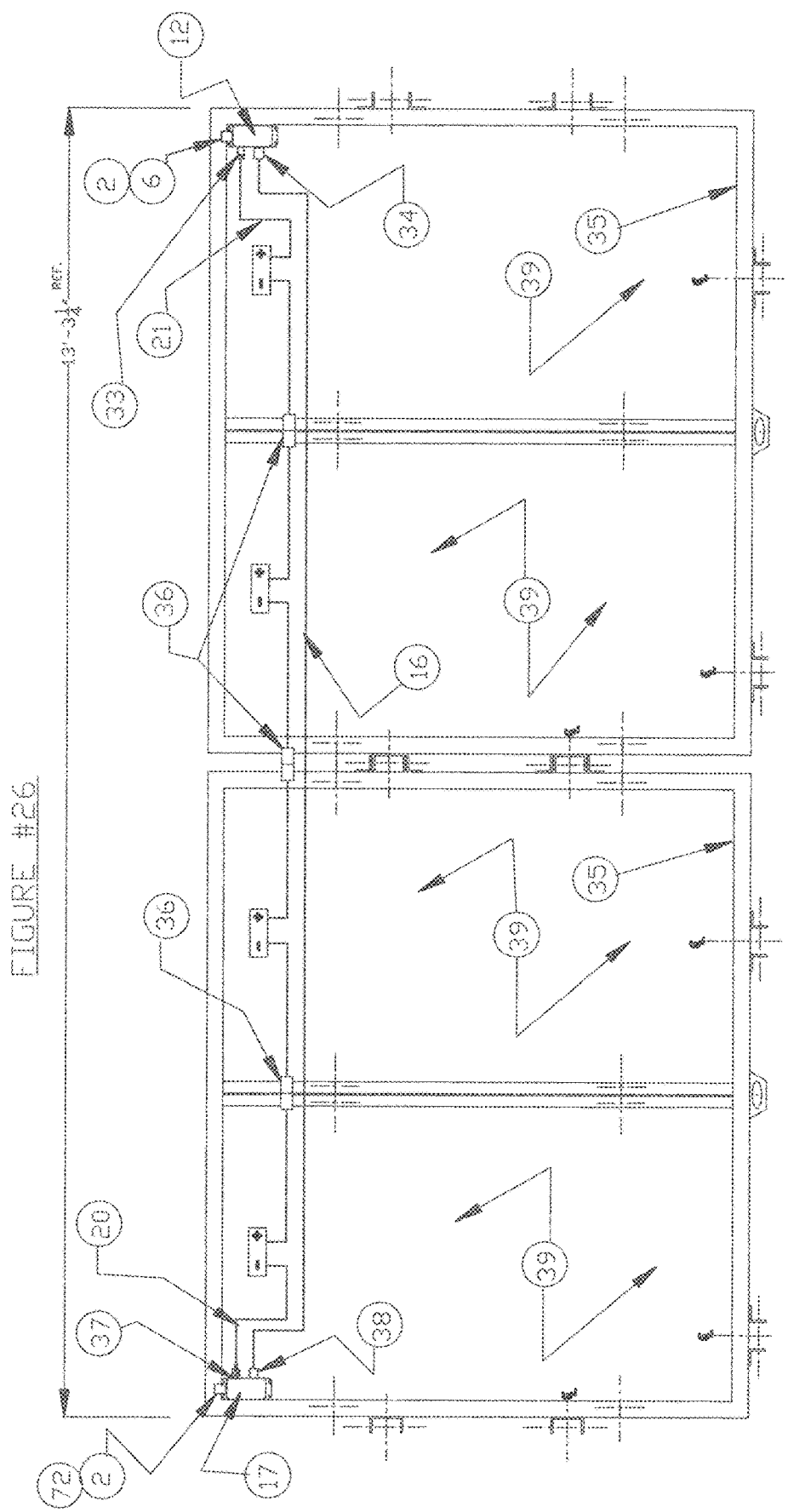

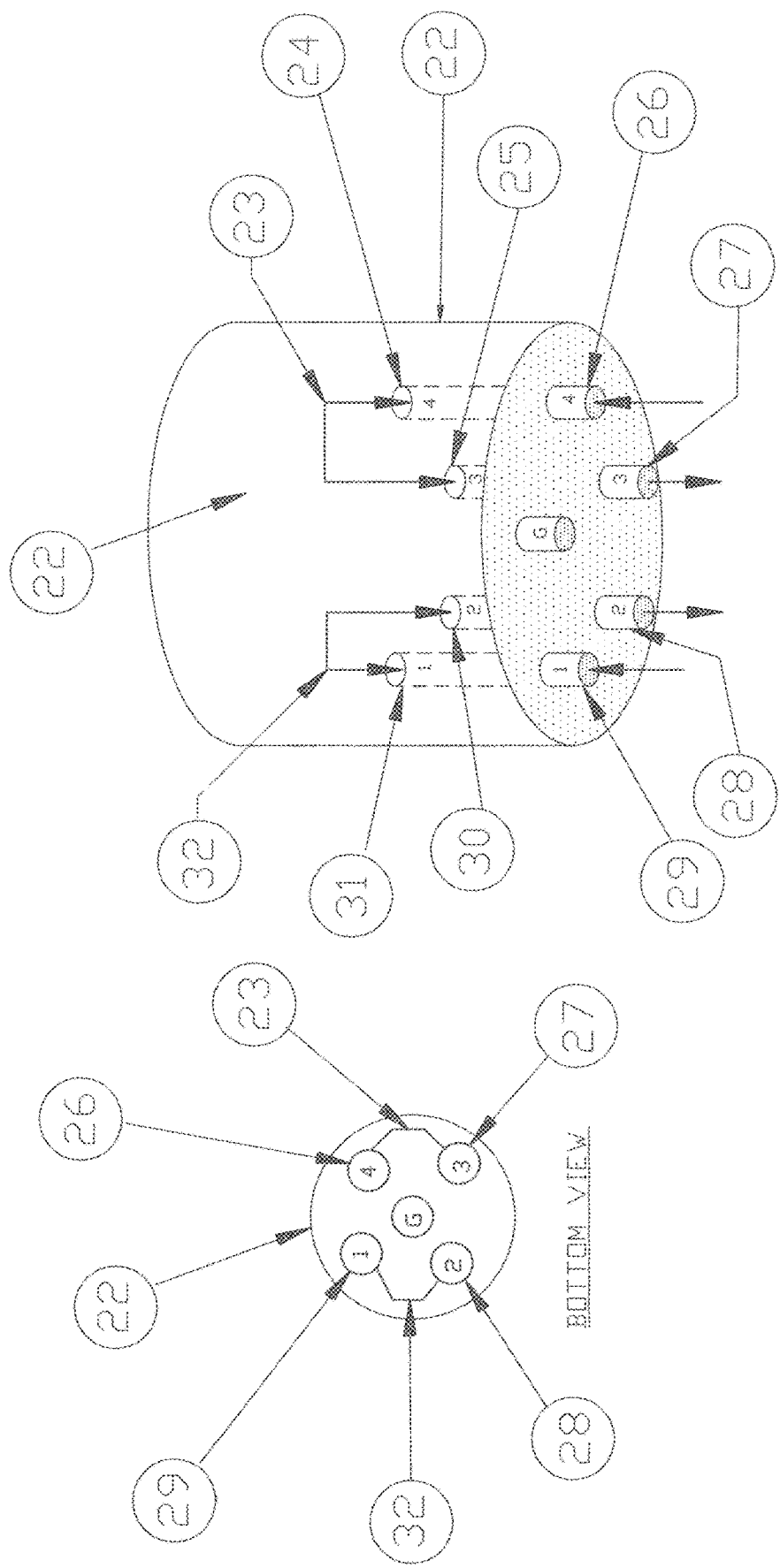

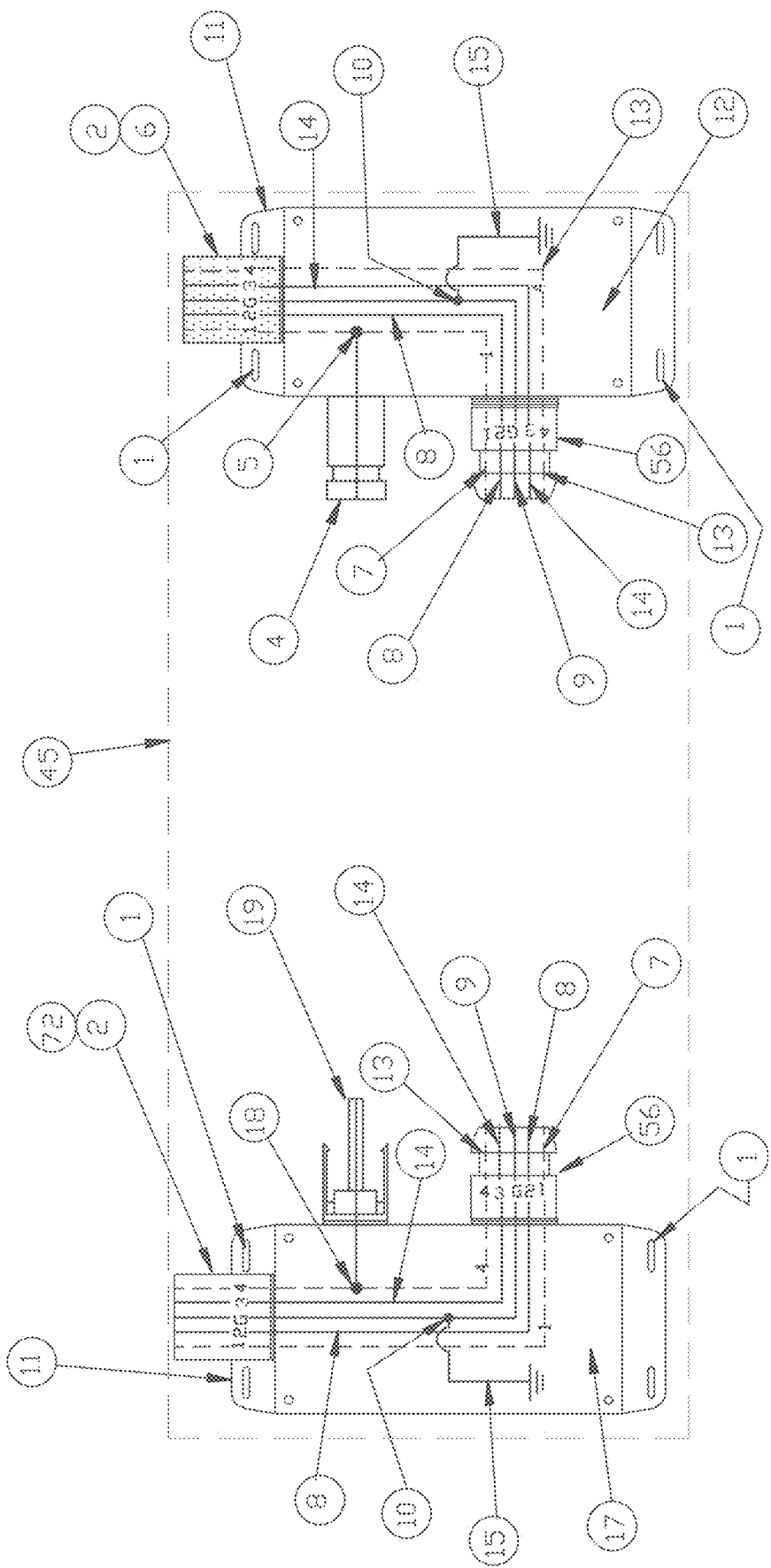

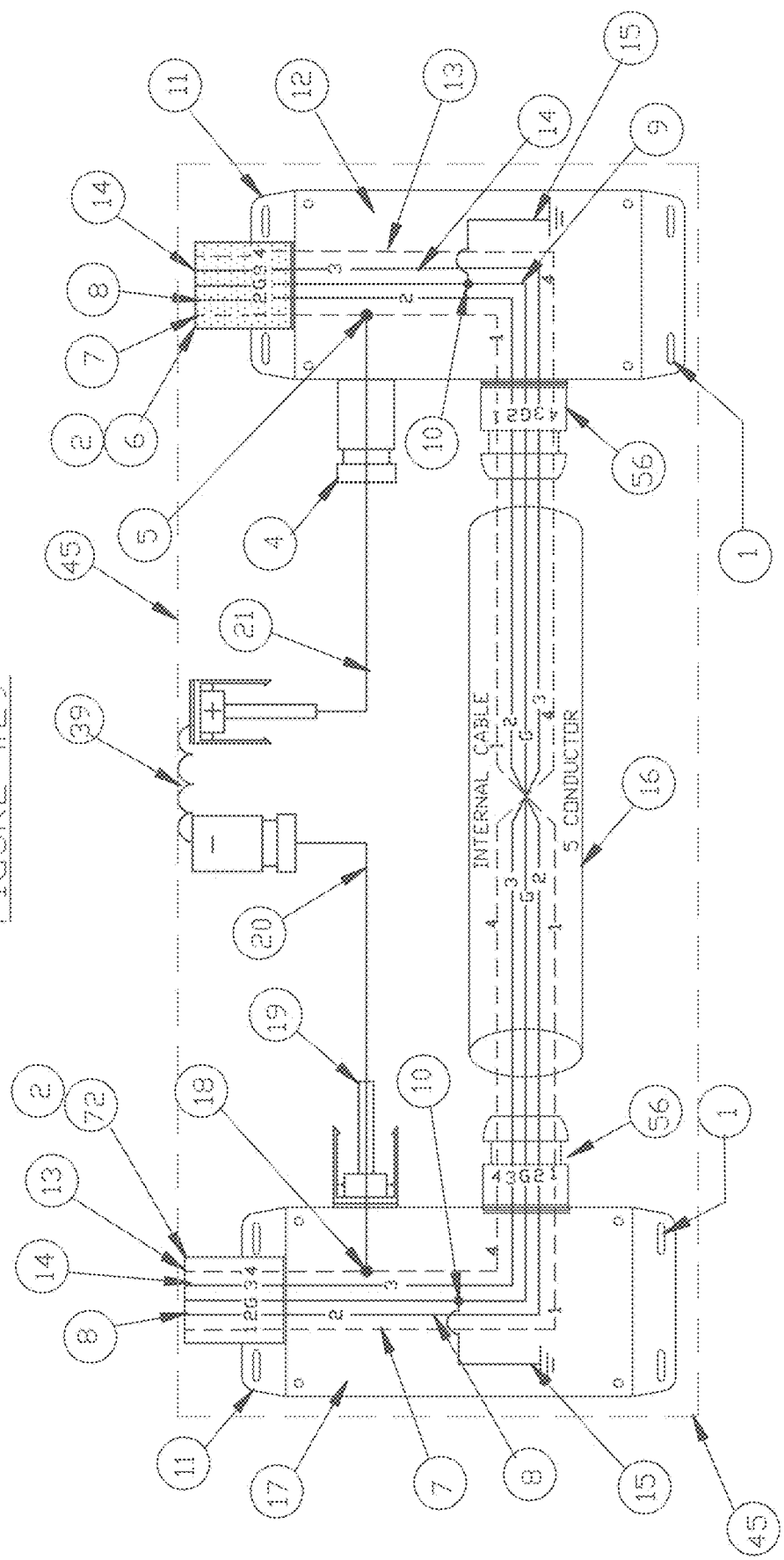
FIGURE #29

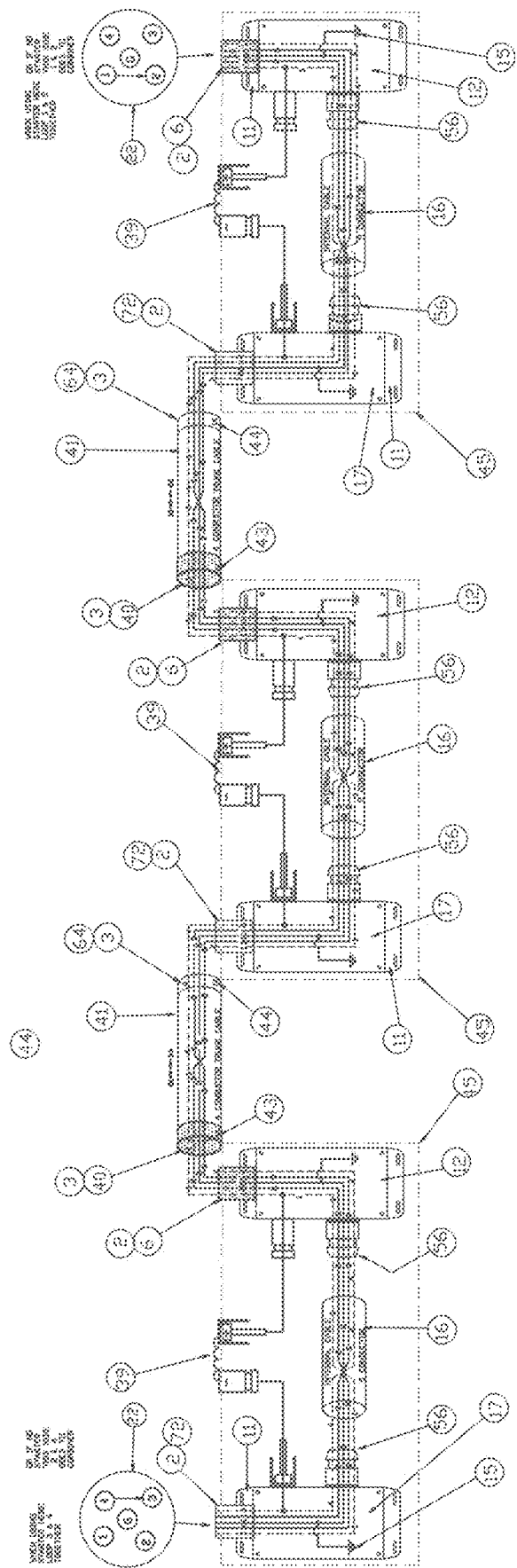

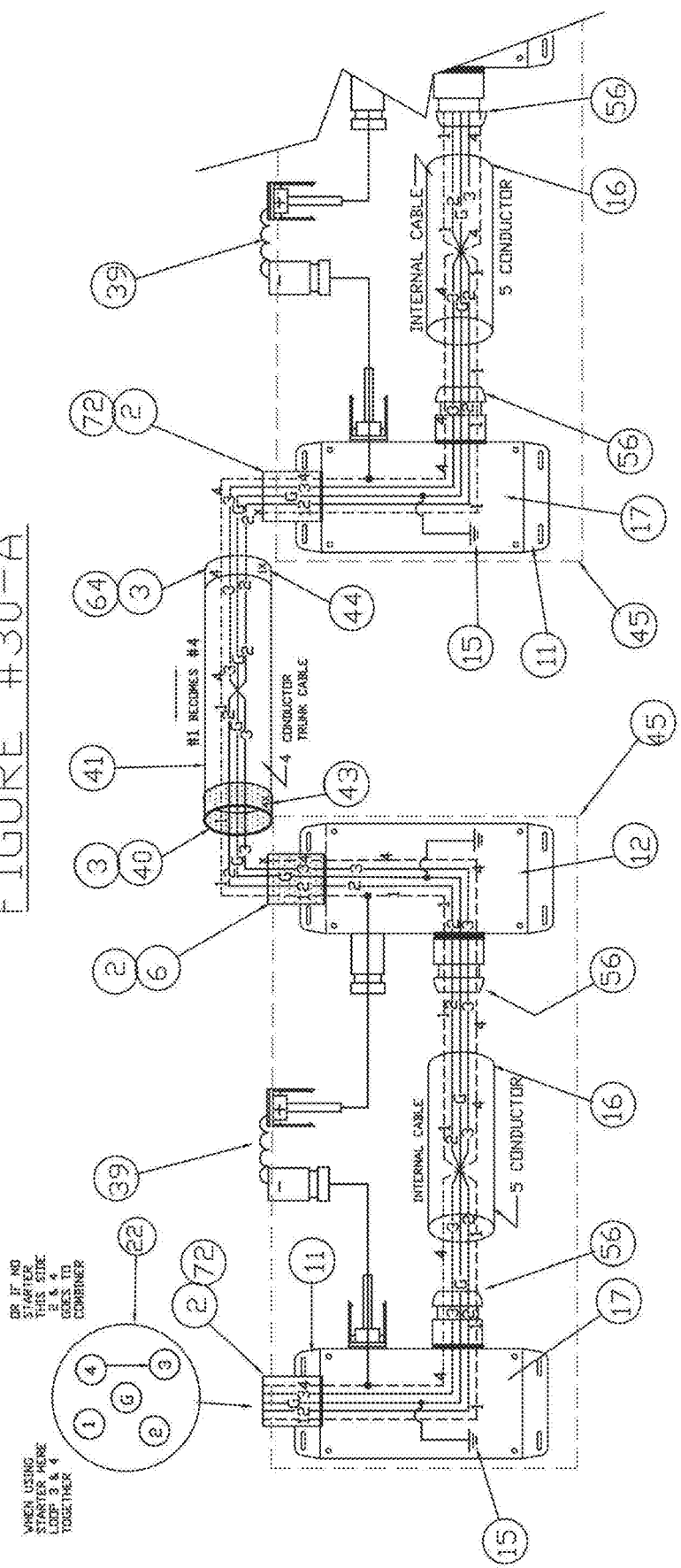

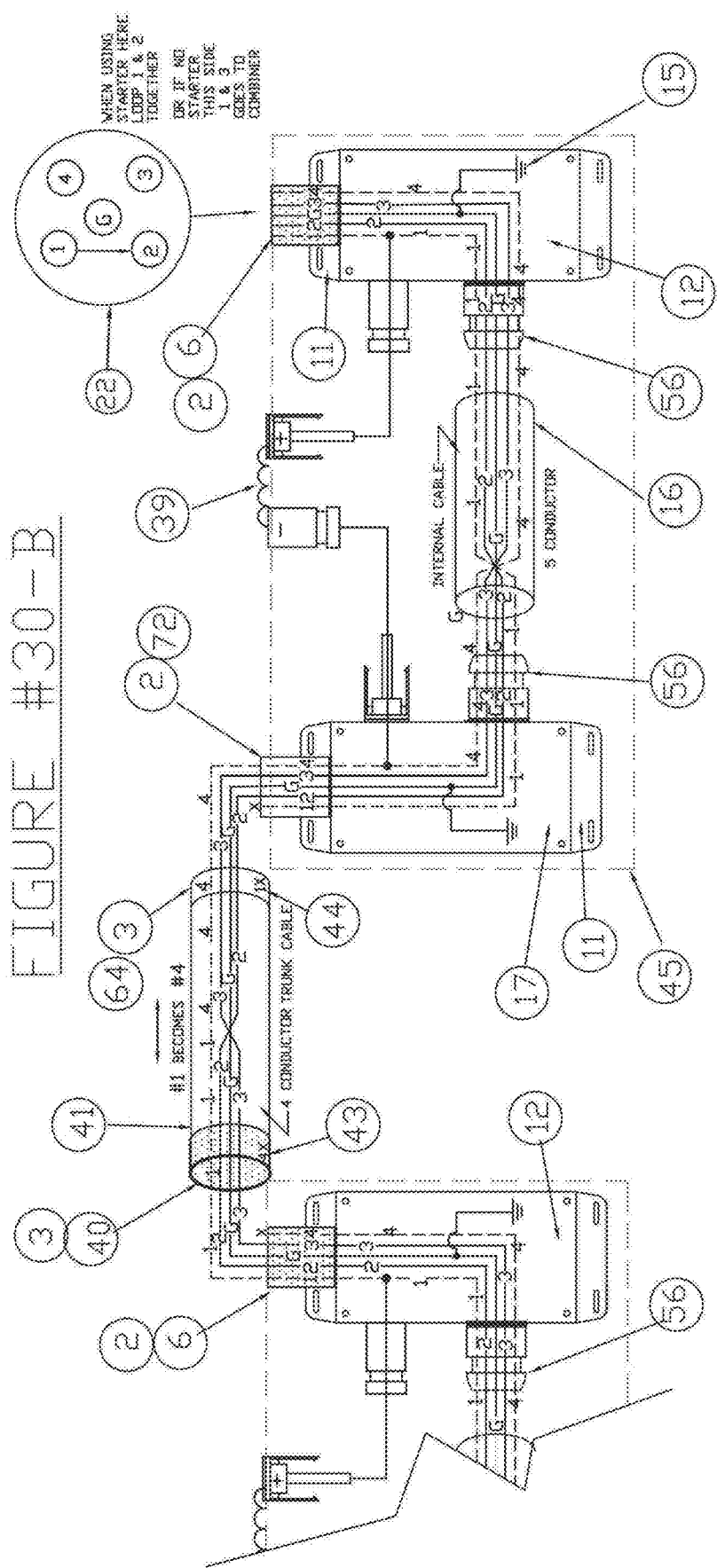

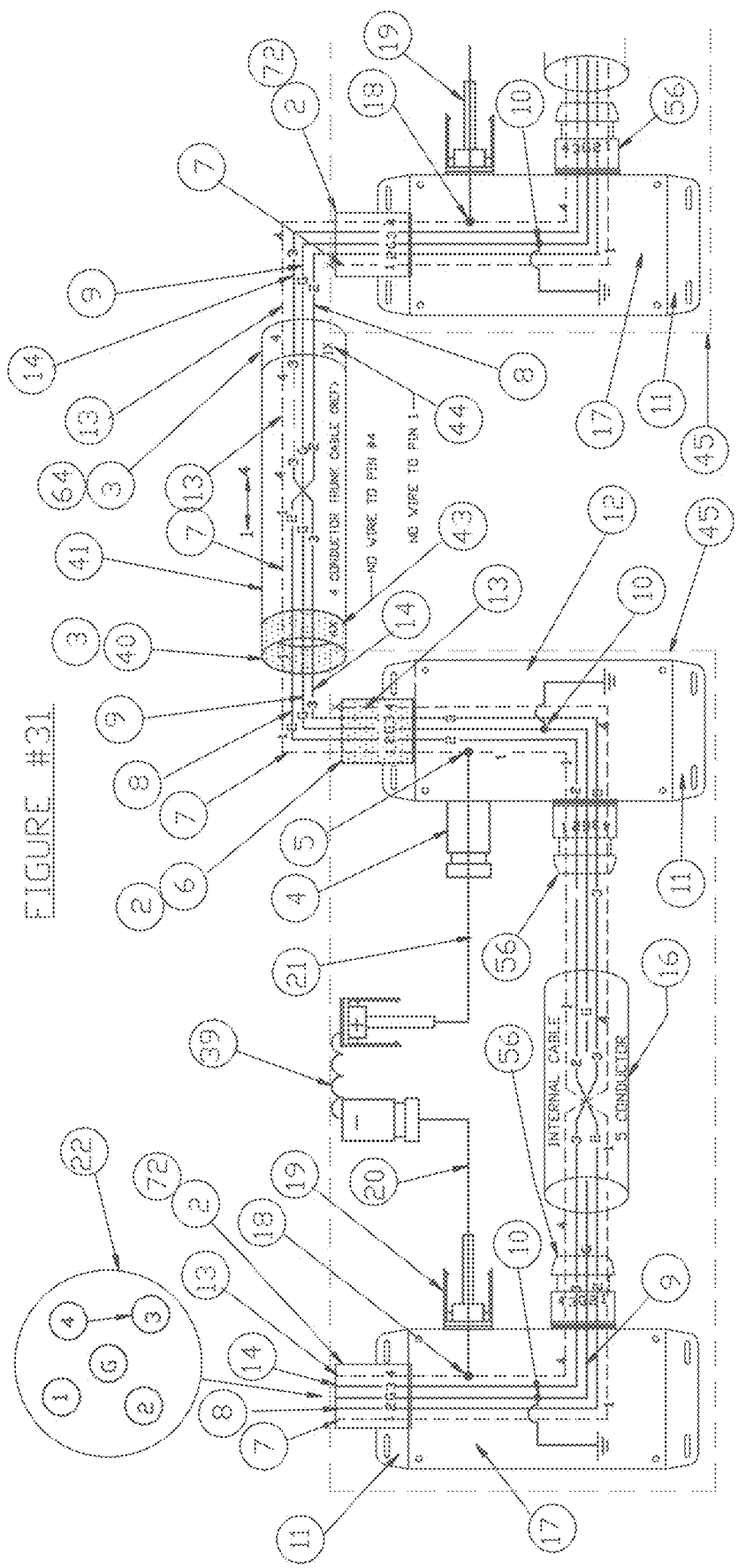

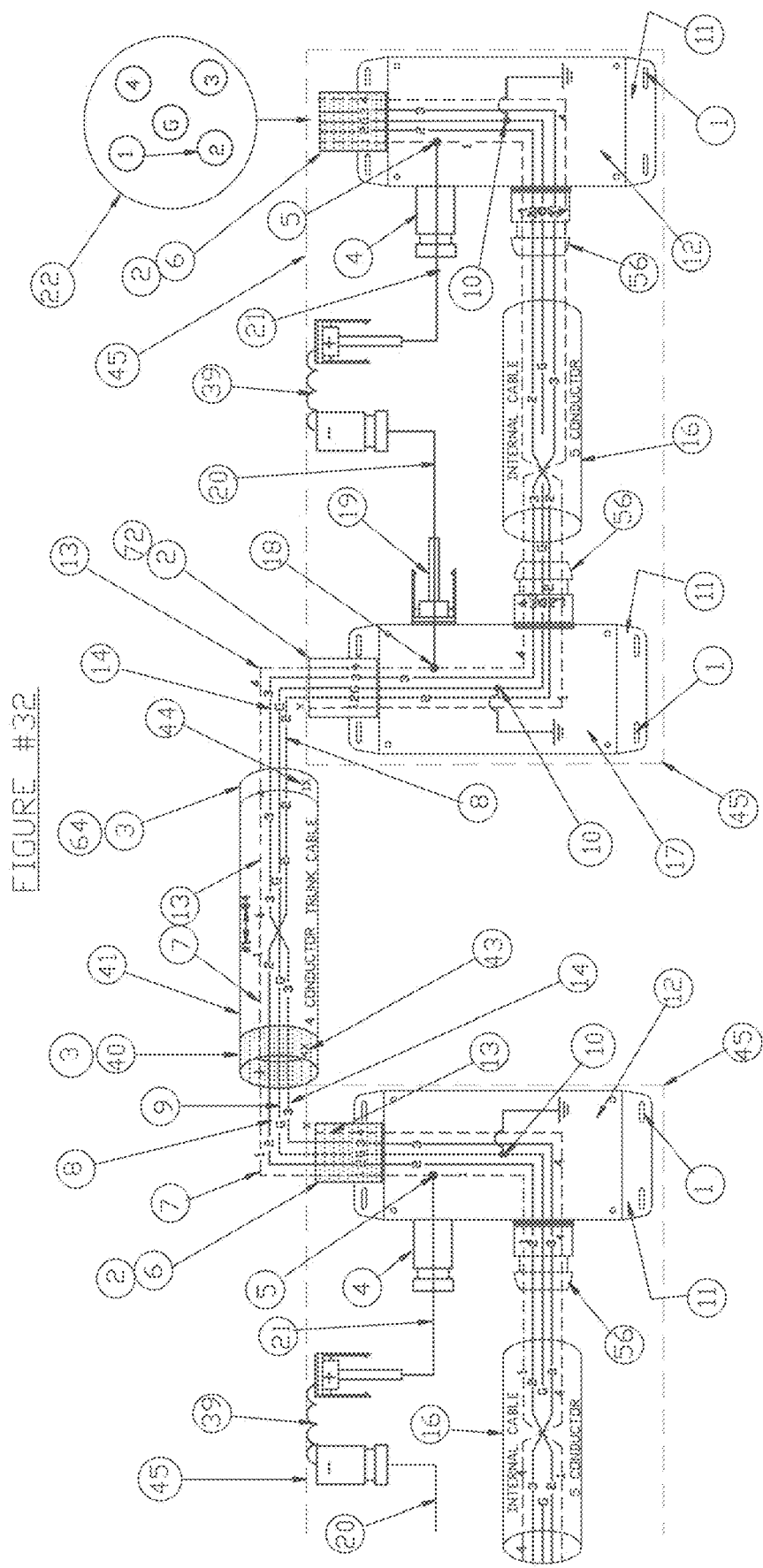

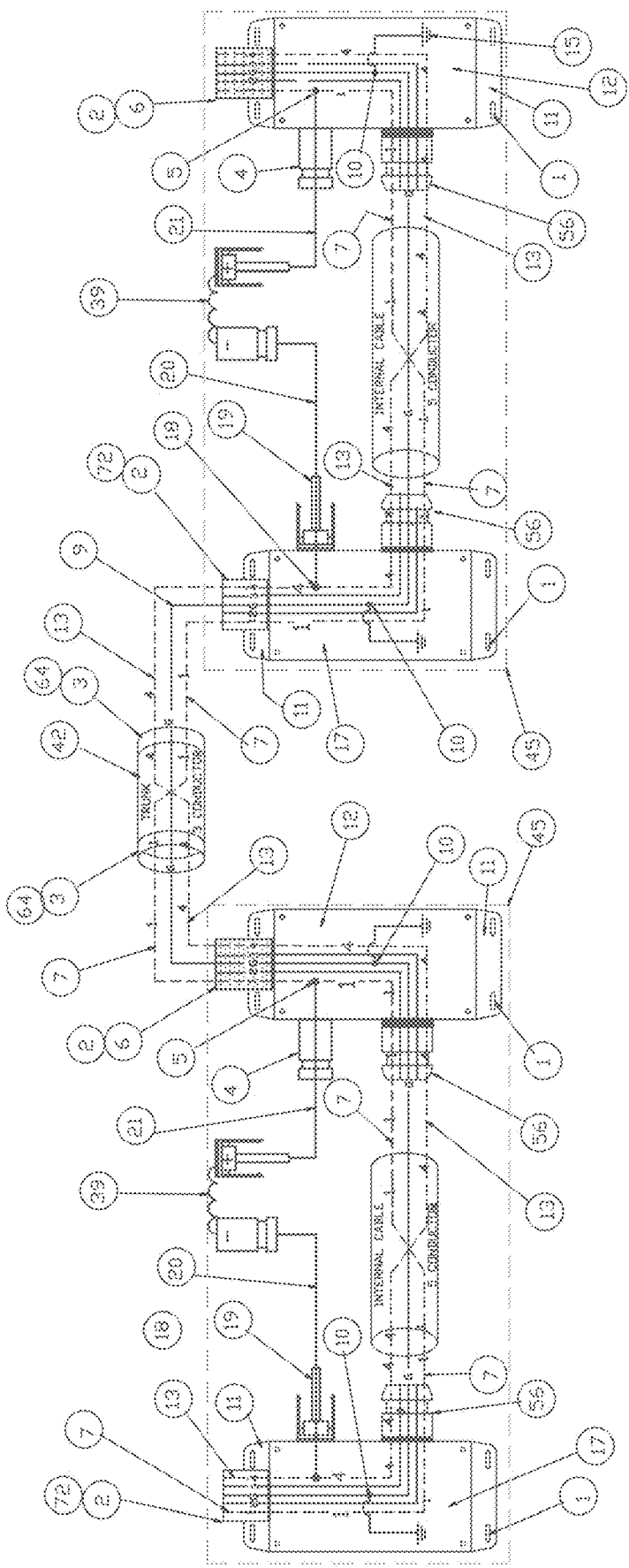

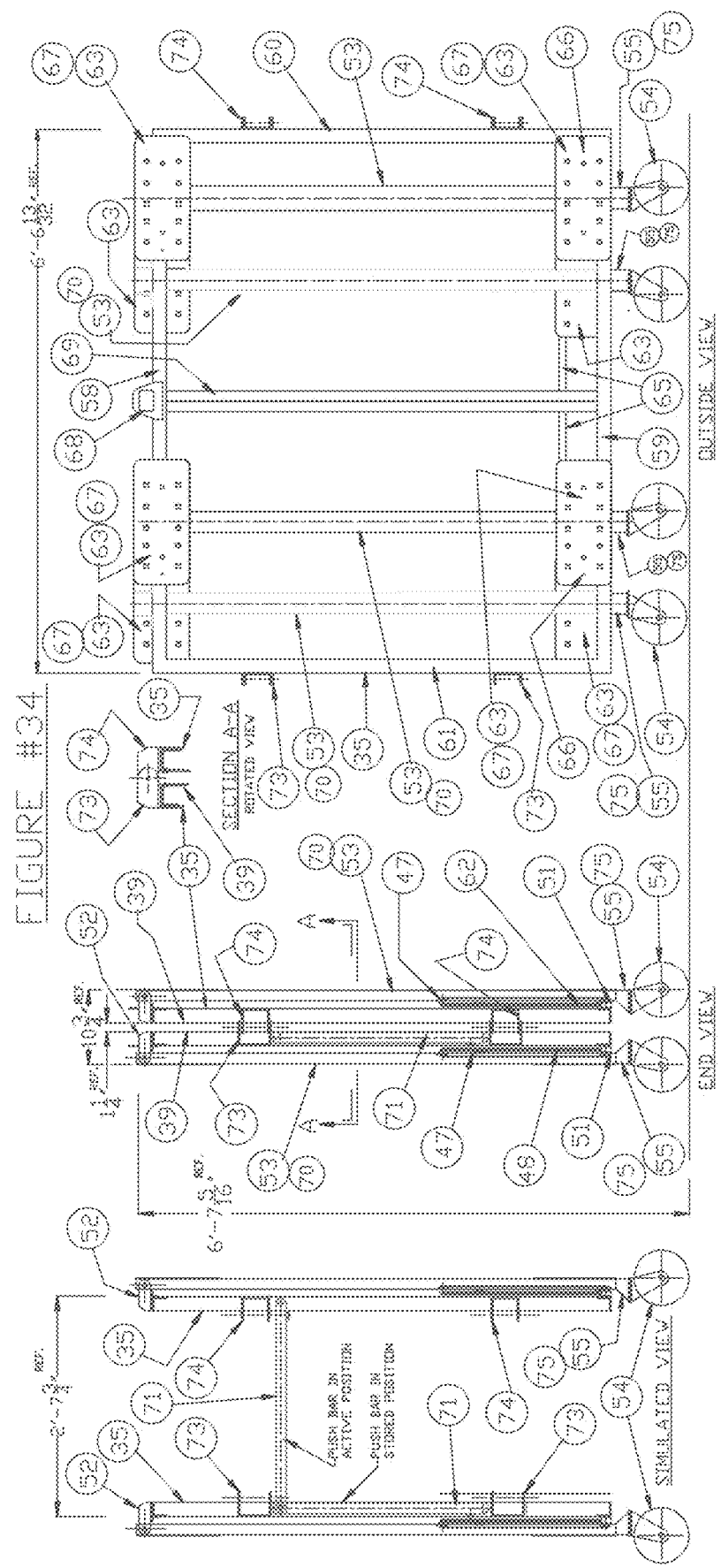

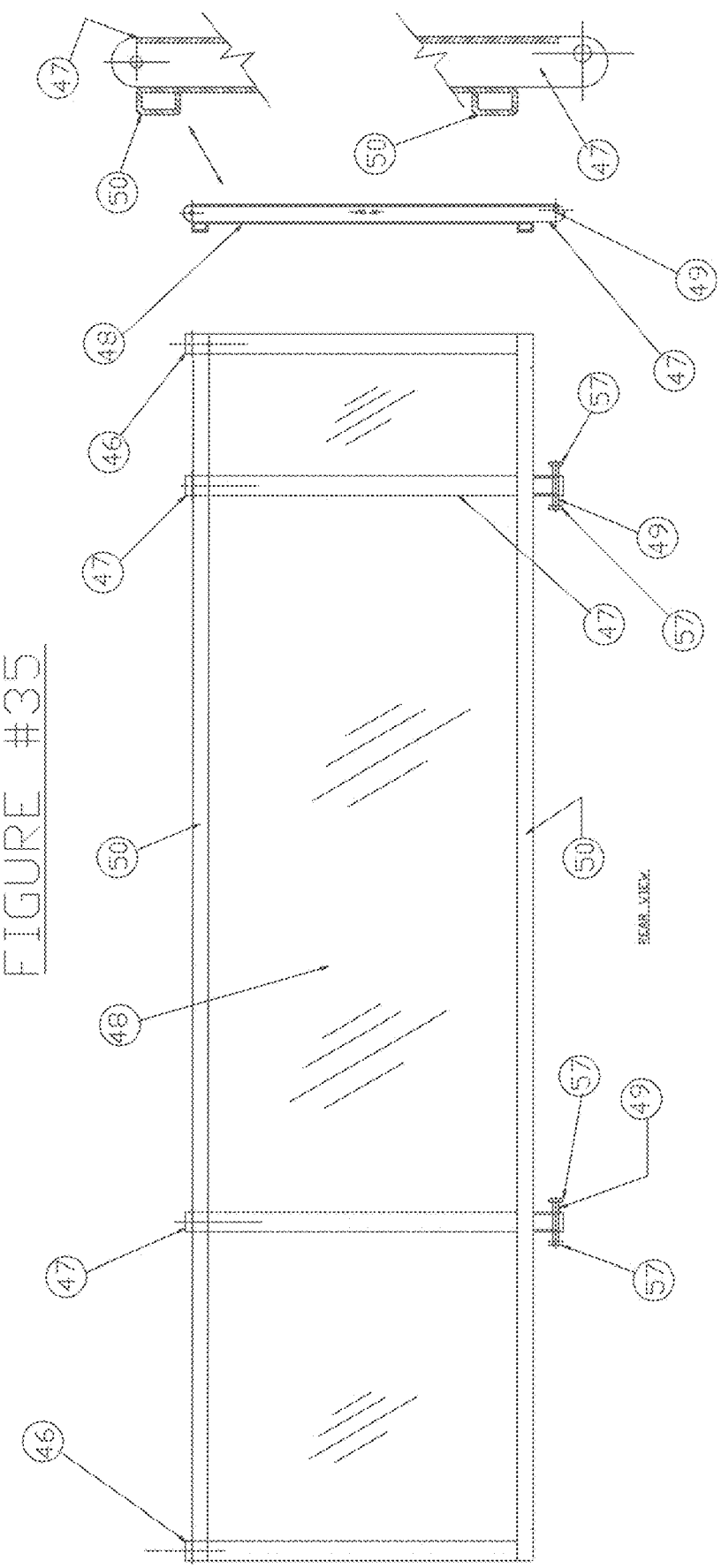

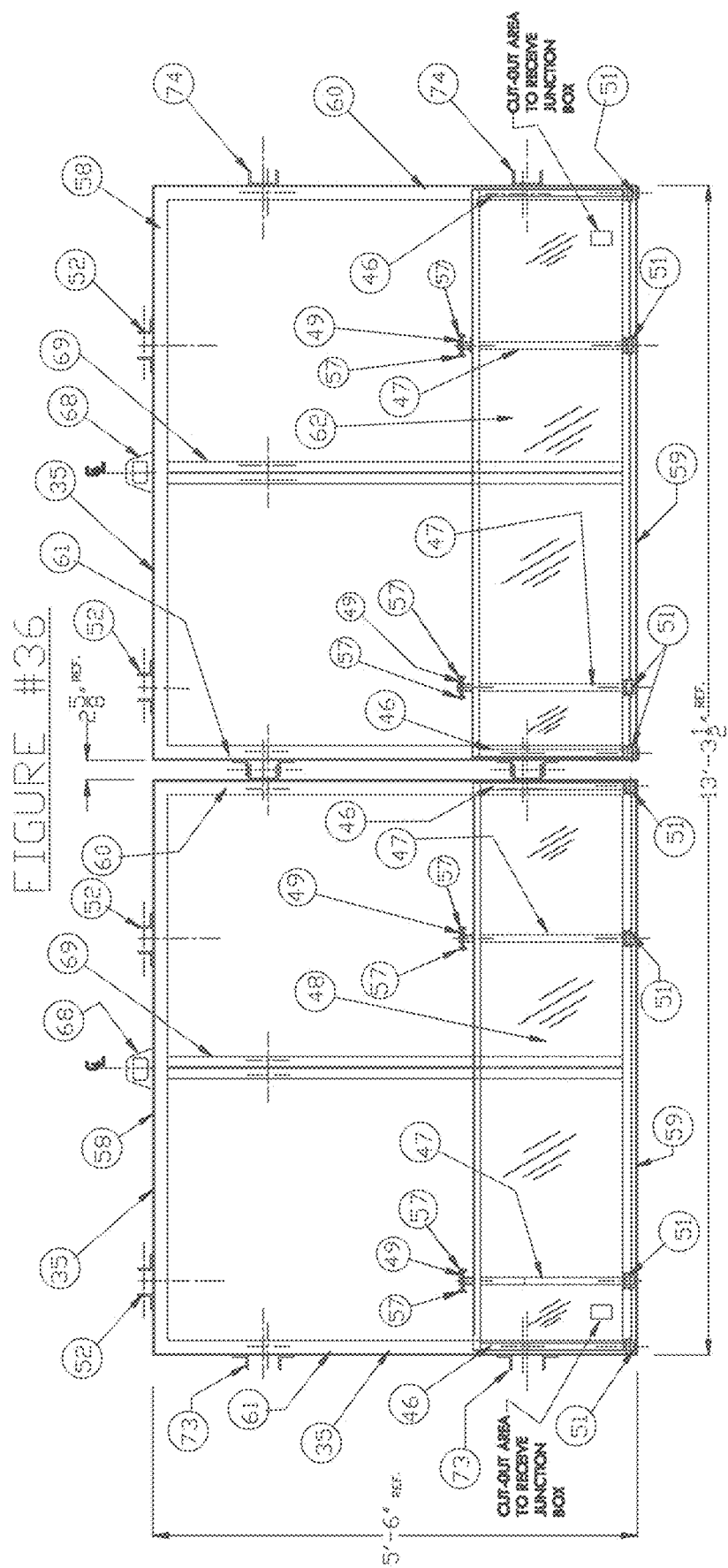

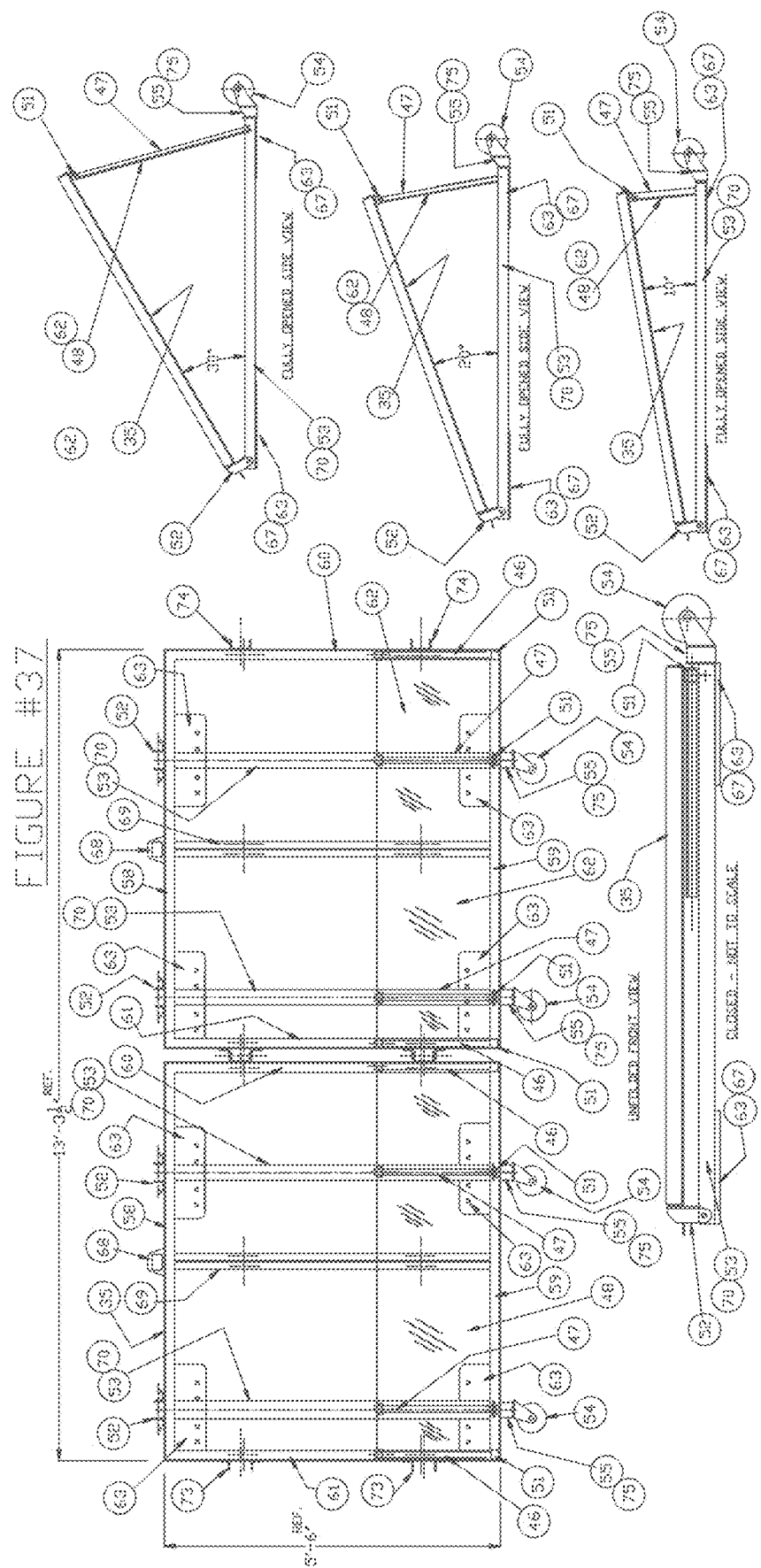

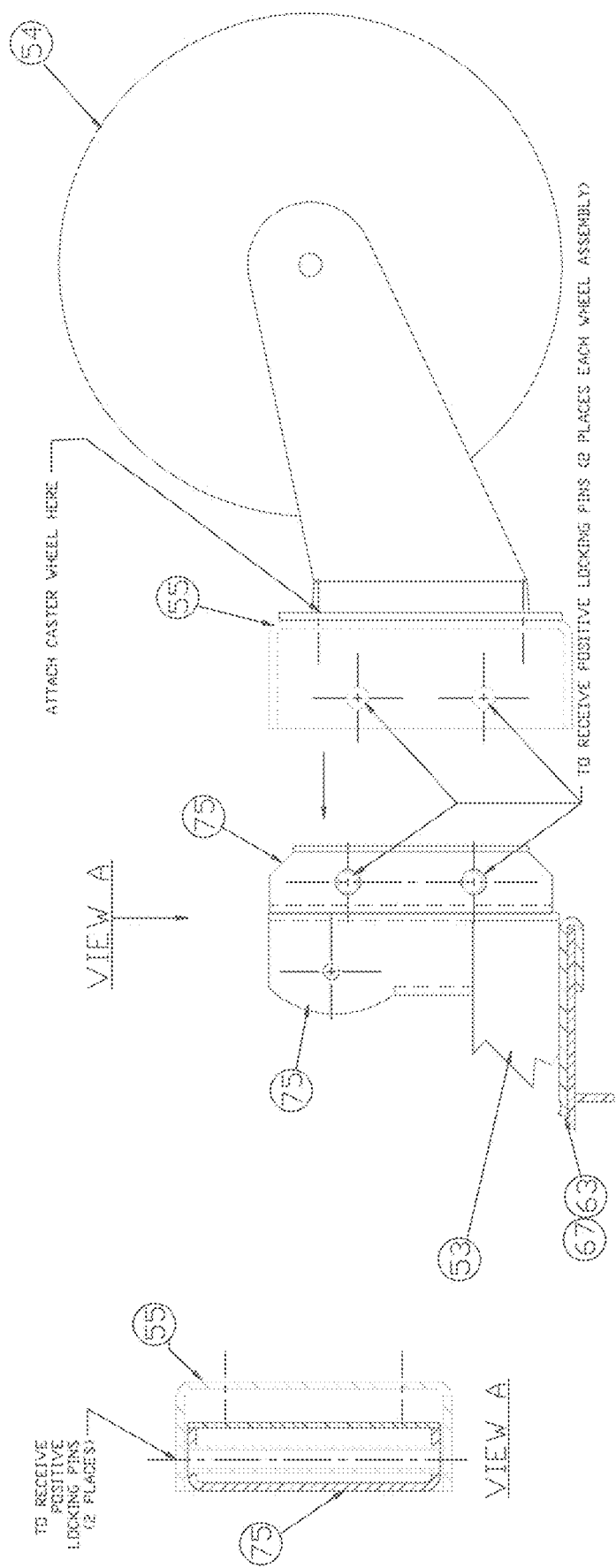

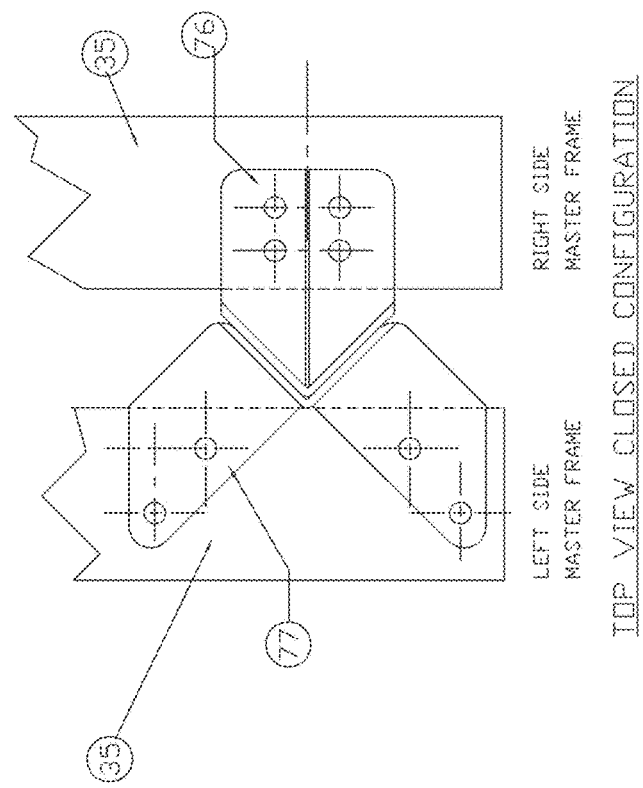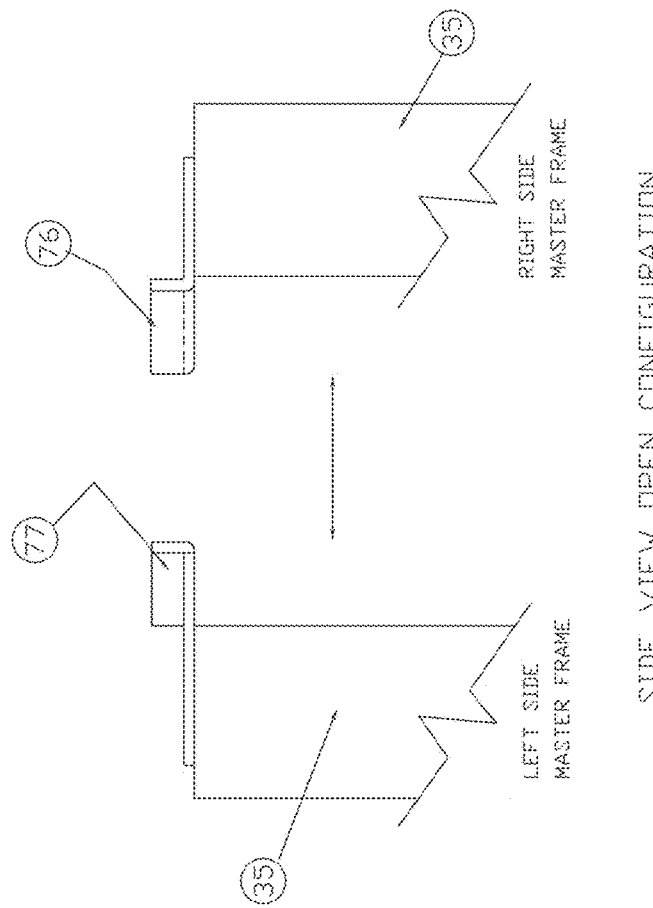
FIGURE #39

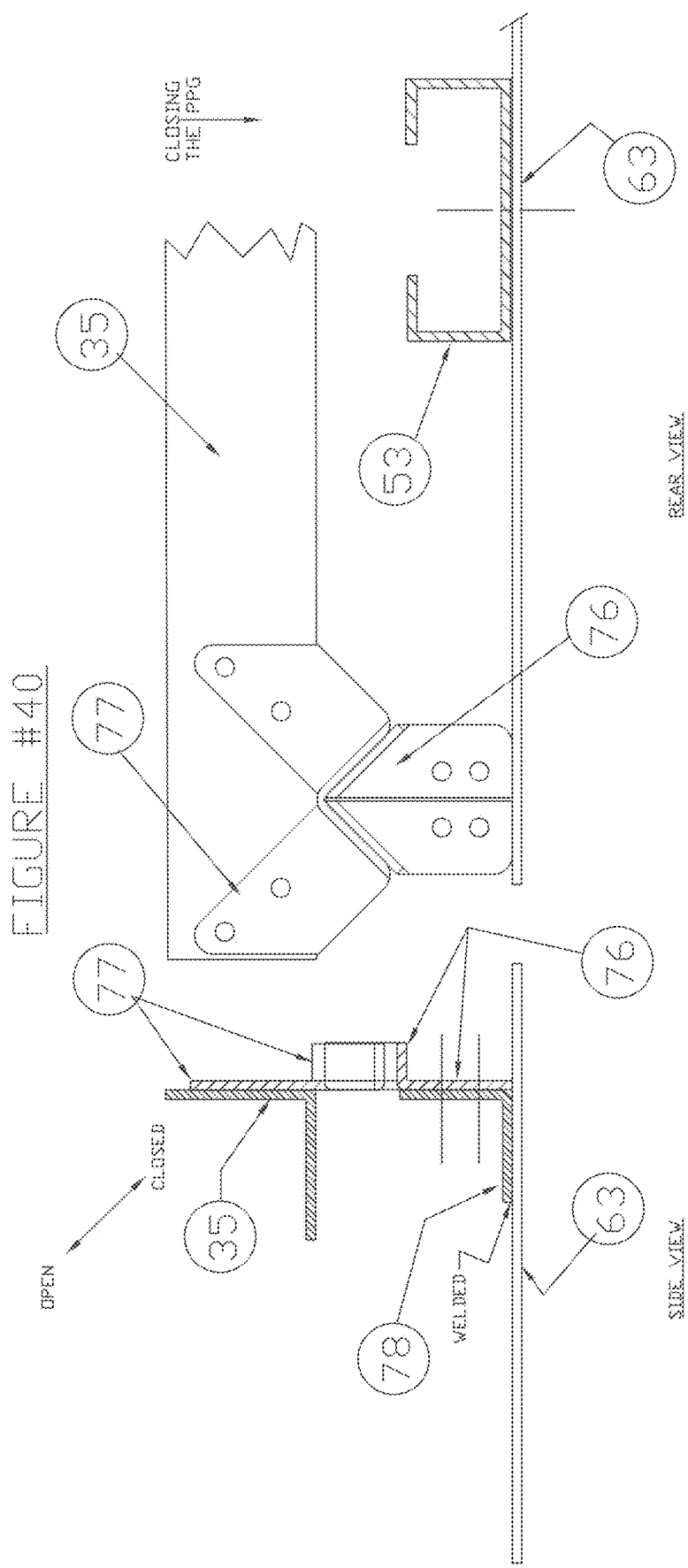

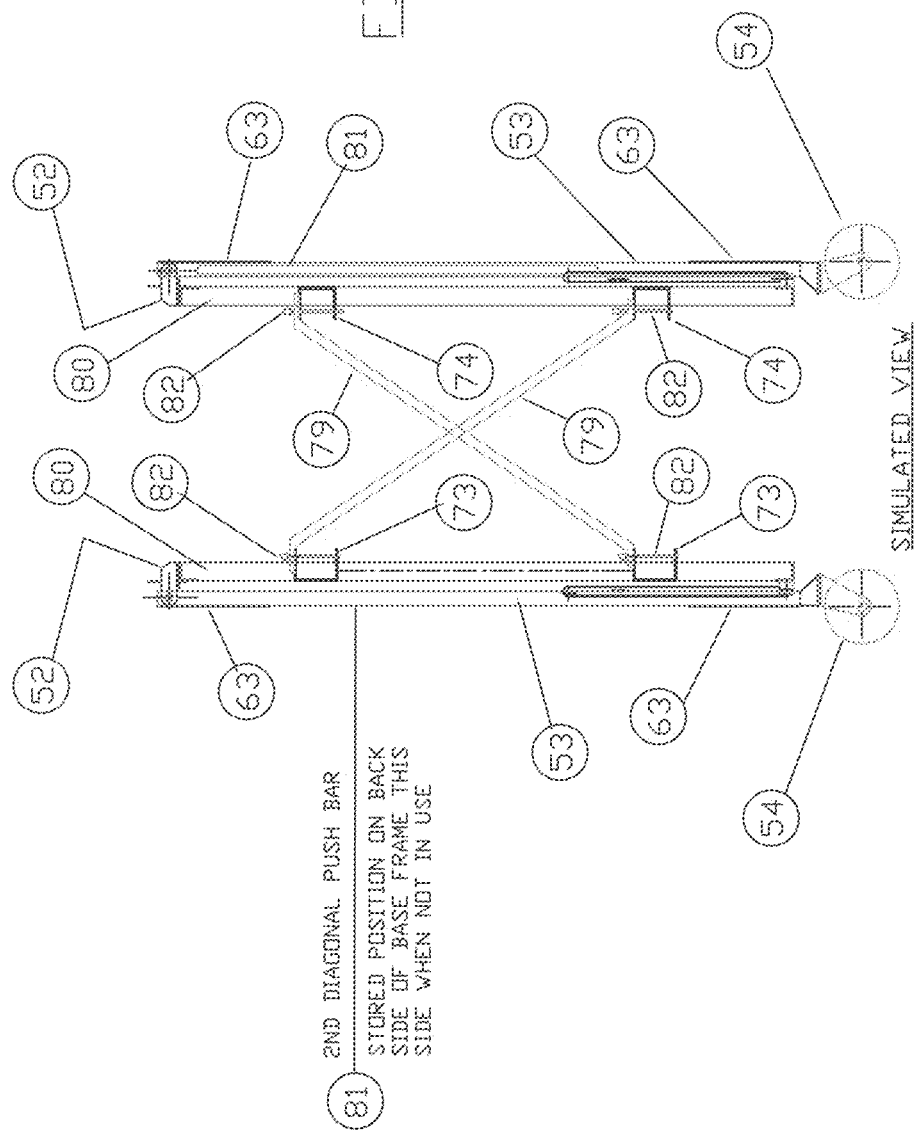

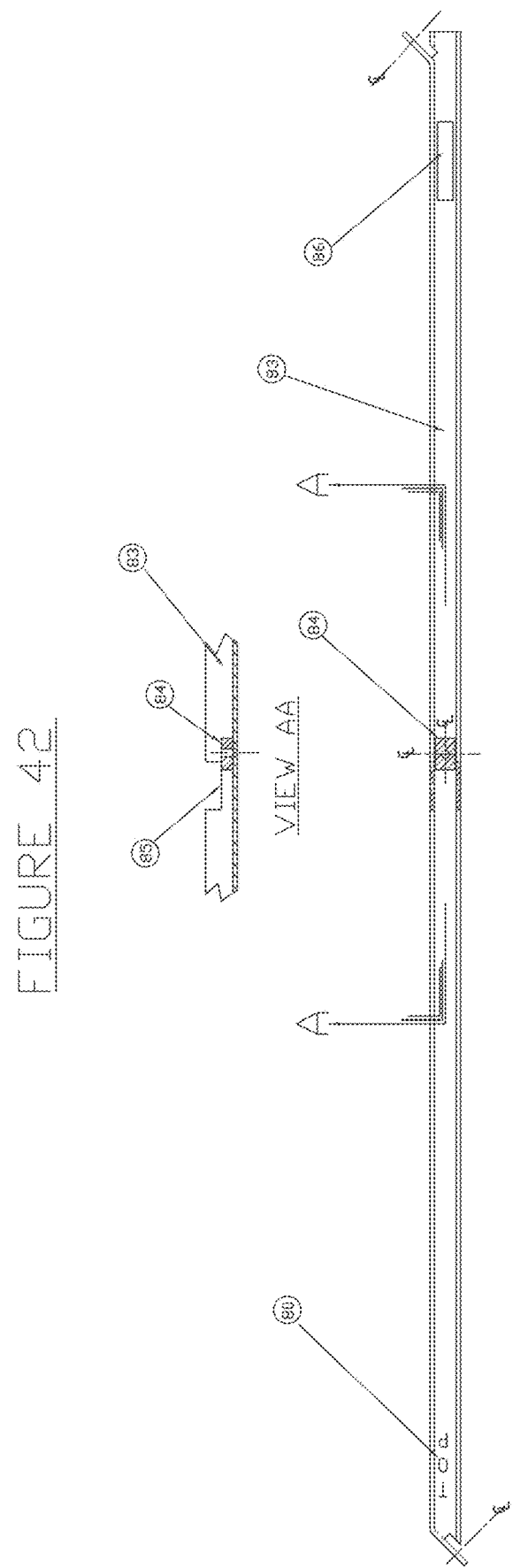

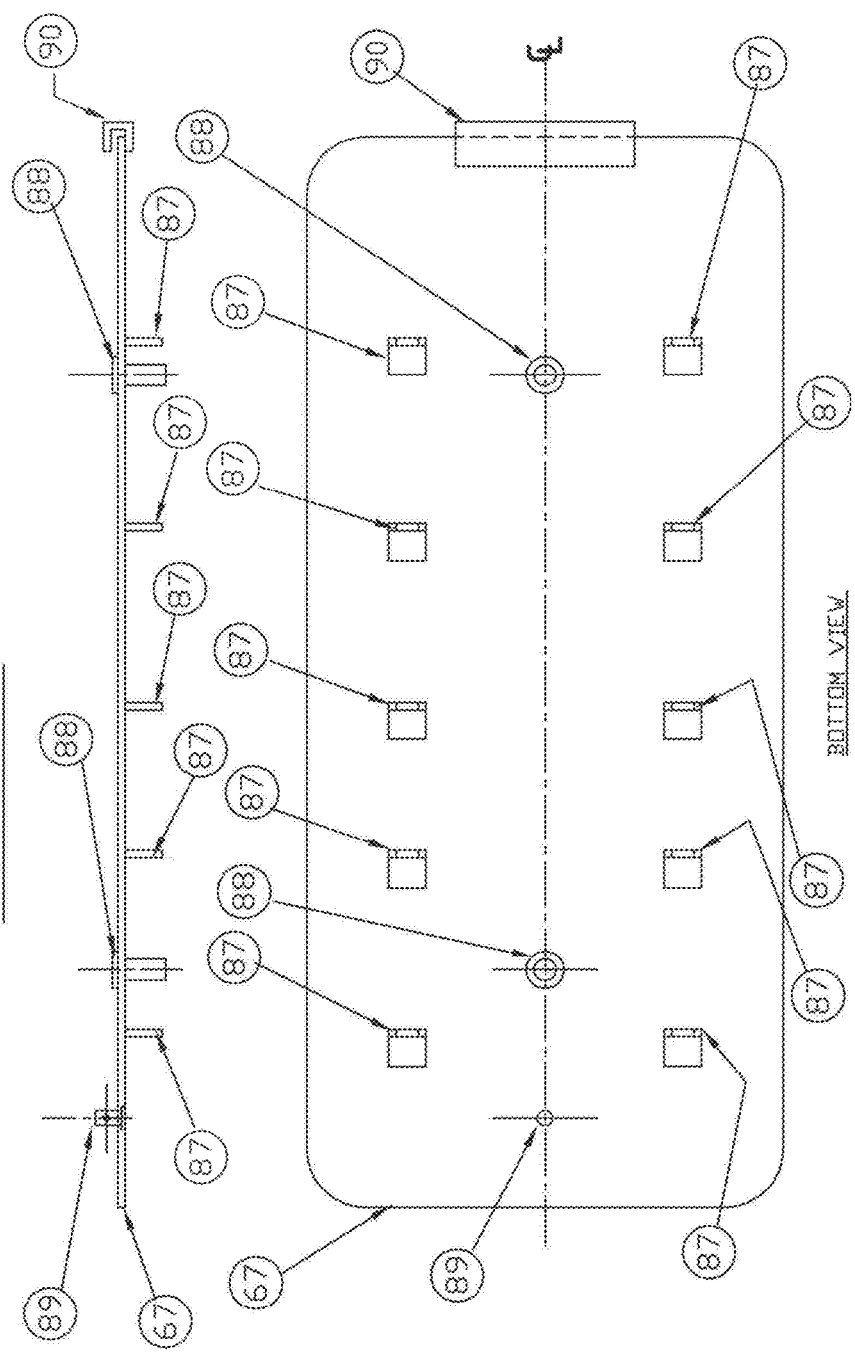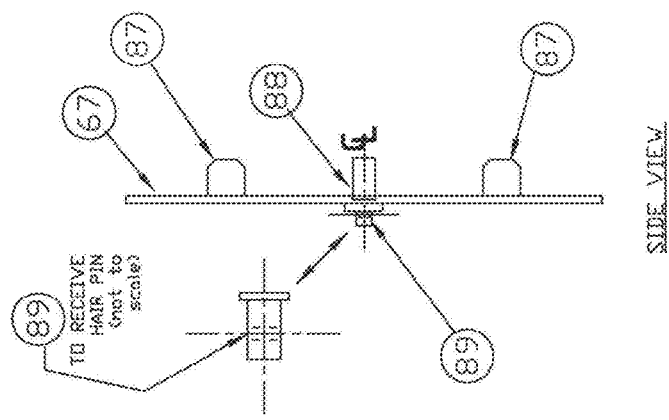

US 10,978,992 B2

MULTIPLE CONFIGURABLE SOLAR PHOTOVOLTAIC ASSEMBLY

CROSS-REFERENCE TO RELATED APPLICATIONS

This application is a continuation of application Ser. No. 16/540,022 filed Aug. 13, 2019, now U.S. Pat. No. 10,840,852, which is a continuation-in-part of application Ser. No. 16/059,318, filed Aug. 9, 2018, now U.S. Pat. No. 10,381,975, which is continuation of application Ser. No. 15/676,993, filed Aug. 14, 2017, which is a continuation-in-part of application Ser. No. 14/827,372, filed Aug. 17, 2015, which is a continuation-in-part of application Ser. No. 13/910,537 filed Jun. 5, 2013, the contents of each of which are herein incorporated by reference in their entireties.

BACKGROUND OF THE INVENTION

The present invention is directed to the field of portable installation of photovoltaic solar modules for generating electricity. In particular, the present invention is directed to an improvement on existing installations, such that the modules can be used interchangeably between an in-series and in parallel wing configuration. This allows for use in high power utility grade installations as well as lower power installations which is not possible with presently available units. In addition, the frame for supporting the solar modules comprises an integrated windscreen.

BRIEF DESCRIPTION OF THE DRAWINGS

FIG. 10a is a back view illustrating a component of the present invention.

FIG. 10b is a side view of the component in FIG. 10a.

FIG. 11a is a front cut-away detail view of a component of the present invention.

FIG. 11b is a side view of the component illustrated in FIG. 11a.

FIG. 12a is a rear view of a component of the present invention.

FIG. 12b is side view of the component illustrated in FIG. 12a.

FIG. 12c is a detail view of part of FIG. 12b.

FIG. 13a is a rear view of a component of the present invention.

FIG. 13b is a top view of a component of the present invention.

FIG. 14a is a front view of an alternate embodiment of the present invention.

FIG. 14b is a side view of an alternate embodiment of the present invention.

FIG. 16 is a plan view of a component of an alternate embodiment of the present invention.

FIG. 18a is a detail view of the operation of a component of an alternate embodiment of the present invention.

FIG. 18b is a detail view of a component of an alternate embodiment of the present invention.

FIG. 26 is a drawing of a Configurable Photovoltaic Assembly of the foundation of this Invention. All Photovoltaic Modules (39) use WEEB-type Washers when being attached to the Master Frame Weldment Assembly (35) to create a Bonding Pass through the Master Frame Weldment Assembly (35).

FIG. 27 is a drawing of the Starter Plug (22) showing the internal wiring.

FIG. 28 is a drawing of the Junction Box-Right (12) and the Junction Box-Left (17) showing mechanical connectors (2) (6), Photovoltaic Connectors (19) (4) and a series of wiring and grounding procedures.

FIG. 29 is a drawing showing the Junction Box-Right (12) and the Junction Box-Left (17) with the 5-Conductor Internal Trunk Cable (16), Photovoltaic Connectors (19) (4) representing Four 60-Cell Photovoltaic Modules (39) and all the related wiring of this Invention.

FIG. 30 is a drawing showing one of the intended uses of this Invention being installed and wired in an In-series Wiring Configuration for a Large Utility Grade Installation where the voltage increases and the amperage is maintained at a low level. Note that the Starter Plug (22) is required to achieve this. This drawing shows that when the Starter Plug (22) is used on the Left End of a twelve Photovoltaic Module Array, the Negative Current is passed from the Internal Pin #4 (24) to the Internal Pin #3 (25) using a Jumper Wire Loop (23). The Negative Wire #3 (14) carries the Negative Current to the other end of the twelve Photovoltaic Modules' String where it is passed to a trunk cable that carries the Current to a Combiner/Inverter. It also shows that when the Starter Plug (22) is used on the Right Side, the Positive Current using a Jumper Wire Loop (32) is passed from the Internal Pin #1 (31) to the Internal Pin #2 (30), and the Positive Wire #2 (8) carries the Positive Current to the other end of the twelve Photovoltaic Module Array where it is then passed to a trunk cable that carries the Current to a Combiner/Inverter.

FIGS. 30A and 30B are drawings showing that the In-Series Wiring Configuration 4-Conductor Trunk Cable (41) does not have a Wire connected to the #4 Pin of the Color Coded Cable Connector Housing (40) and the Male 5-Pin Connector (3), or to the #1 Pin of the Clear Cable Connector Housing (64) and the Male 5-Pin Connector (3). The Wire coming into the Clear Cable Connector Housing (64) and the Male 5-Pin Connector (3) #4 Pin is attached to the Color Coded Cable Connector Housing (40) and the Male 5-Pin Connector (3) #1 Pin.

FIG. 31 is a more detailed drawing showing when the Starter Plug (22) is used on the Left Side of a Three Portable Power Generator (PPG) Array. The In-Series Wiring Configuration 4-Conductor Trunk Cable (41) transfers the negative current from the Junction Box-Right Side (12) to the Junction Box-Left Side (17) when connecting a PPG to another PPG with the wiring configuration being in an In-series Wiring Configuration. The drawing also shows the use of the Invention when the power is going from Left to Right using the Starter Plug (22) to direct the Negative Current Flow from the #4 Pin to the #3 Pin.

FIG. 32 is a more detailed drawing showing how when the Starter Plug (22) is used on the Right Side of the three PPG Array, the In-Series Wiring Configuration 4-Conductor Trunk Cable (41) passes the Current from the Junction Box-Left Side (17) to the Junction Box-Right Side (12) of the next PPG. The drawing also shows the use of this Invention when the power is going from Right to Left using the Starter Plug (22) to direct the Current Flow.

FIG. 33 is a drawing showing two PPGS being connected in an In-Parallel Configuration with no Starter Plug (22) needed. It also shows one of the intended uses of this Invention being wired and installed in an In-parallel Wiring Configuration with another similarly wired unit so that the voltage will be controlled at a low volume but allowing the amperage to double its volume.

FIG. 34 is a drawing showing the Invention in a Closed Travel Configuration thus showing the way the Master Frame Weldment Assembly (35) and the Base Frame Extrusion (53) encapsulate the Four 60-Cell Photovoltaic Modules (39) as a protective measure.

FIG. 35 is a drawing showing the Invention with all of the Components that make up the Built-in Fold-out Windscreen Invention (48) (62). (62) Not shown as it is the mirror image of (48).

FIG. 36 is a drawing showing how the Built-in Fold-Out Windscreens (48) (62) are located when folded into the Master Frame Weldment Assembly (35). (48) to have cut-out area on Left Side to receive Junction Box. (62) to have cut-out area on Right Side to receive Junction Box.

FIG. 37 is a drawing showing the Built-in Fold-out Windscreens (48) (62) in the Folded and Unfolded Configurations and identifies the locations of the Master Frame Weldment Assembly Hinge (52), Swivel Caster Wheels (54), the Quick Release Quick Detachable No-Flat Caster Wheel Assembly (55) and the Channel End Plate and Caster Wheel Holding Bracket Assembly (75).

FIG. 38 is a drawing showing the Channel End Plate and Caster Wheel Holding Bracket Assembly (75) in relation to the Base Frame Extrusion (53) and the Stabilizers (63) while demonstrating the activity of the Quick Release Quick Detachable No-Flat Caster Wheel Assembly (55) with the attached Swivel Caster Wheels (54) and the intended use of two Positive Locking Pins with each assembly.

FIG. 39 is a drawing showing the Male Alignment Fixture (76) and the Female Alignment Fixture (77) in relation to the Left side and Right side Master Frames (35). There is a side view and a top view to illustrate the mounting of the Male Alignment Fixture (76) and the Female Alignment Fixture (77).

FIG. 40 is a drawing showing the Male Alignment Fixture (76) and the Female Alignment Fixture (77) in relation to the left rear location of the Base Frame Extrusion (53) and the closing of the Master Frame (35).

FIG. 41 is a drawing showing the installation and attachments of two Diagonal Push Bars (79) in relation to the Master Frame Assembly (35). FIG. 41 also illustrates how the Diagonal Push Bars (79) are located when in their stored configuration (81) when attached to the Base Frame Extrusion (53).

FIG. 42 is a drawing showing a configuration of the Diagonal Push Bar (83), including the location of the Alignment Block (84) for aligning the of the Diagonal Push Bar (83) with a positional pin, and Directional Engraving (80).

FIG. 43 is a drawing showing a configuration of the Claw (67), including the Claw Channel (90), Claw Locking Pin (89), Claw Locators (88), Claw Locking Pin (89) and the Claw Protrusions (87).

SUMMARY OF THE INVENTION

Figure 1:
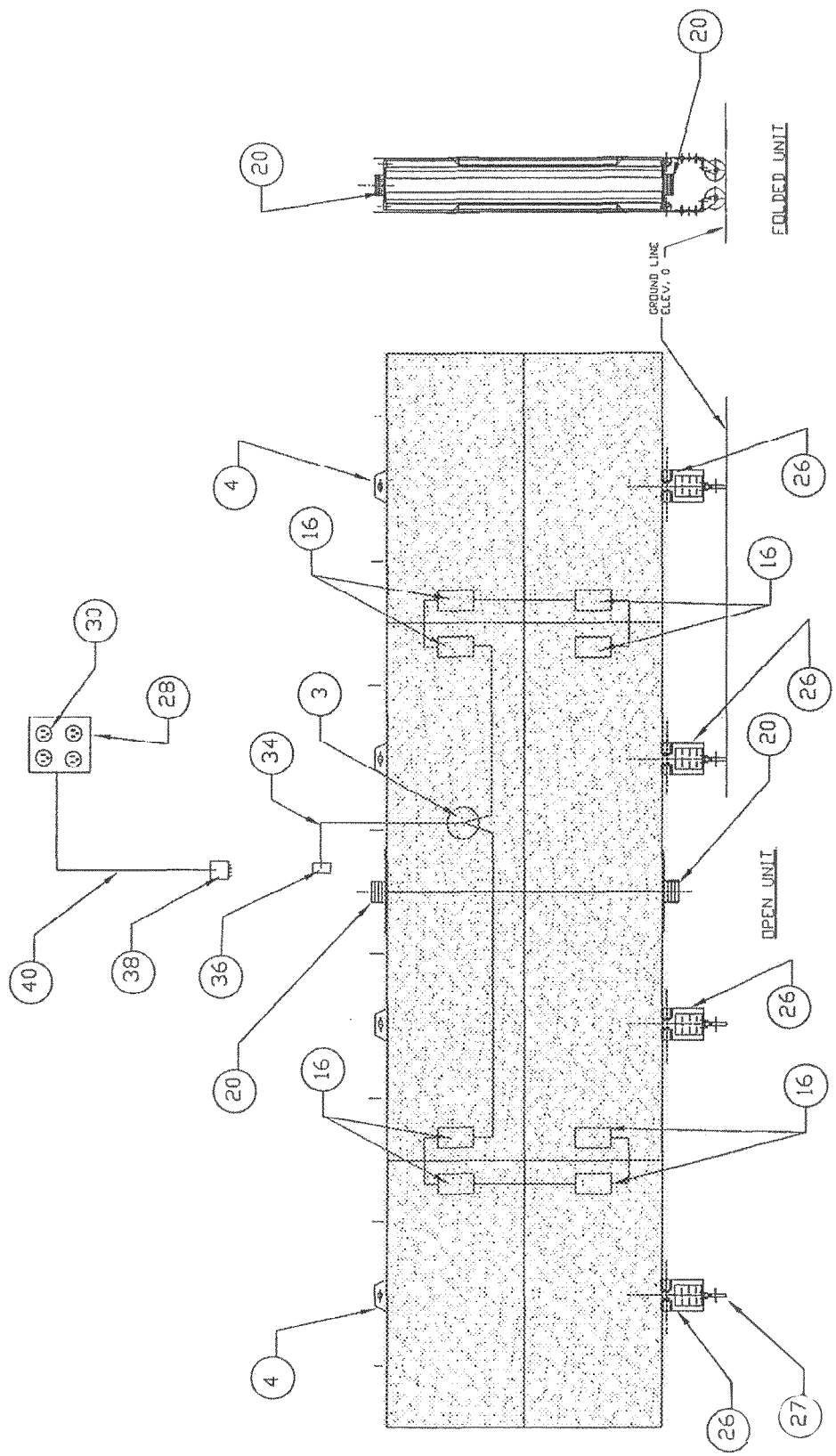
FIG. 1a is a front view of an embodiment of the device of the present invention.
FIG. 1b is a side view of an embodiment of the device of the present invention.
Figure 2:
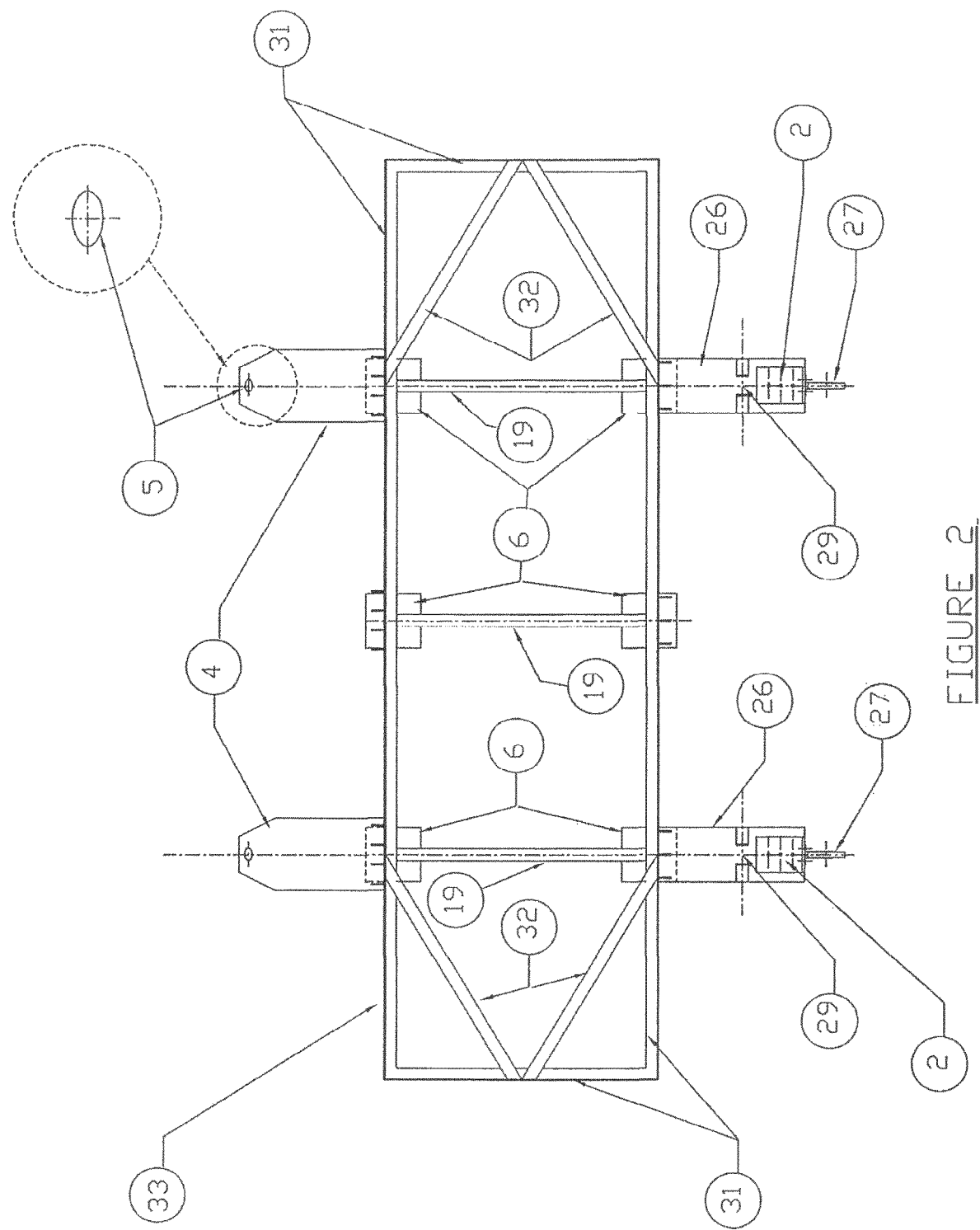
FIG. 2 is a back view of an embodiment of the device of the present invention.
Figure 3:
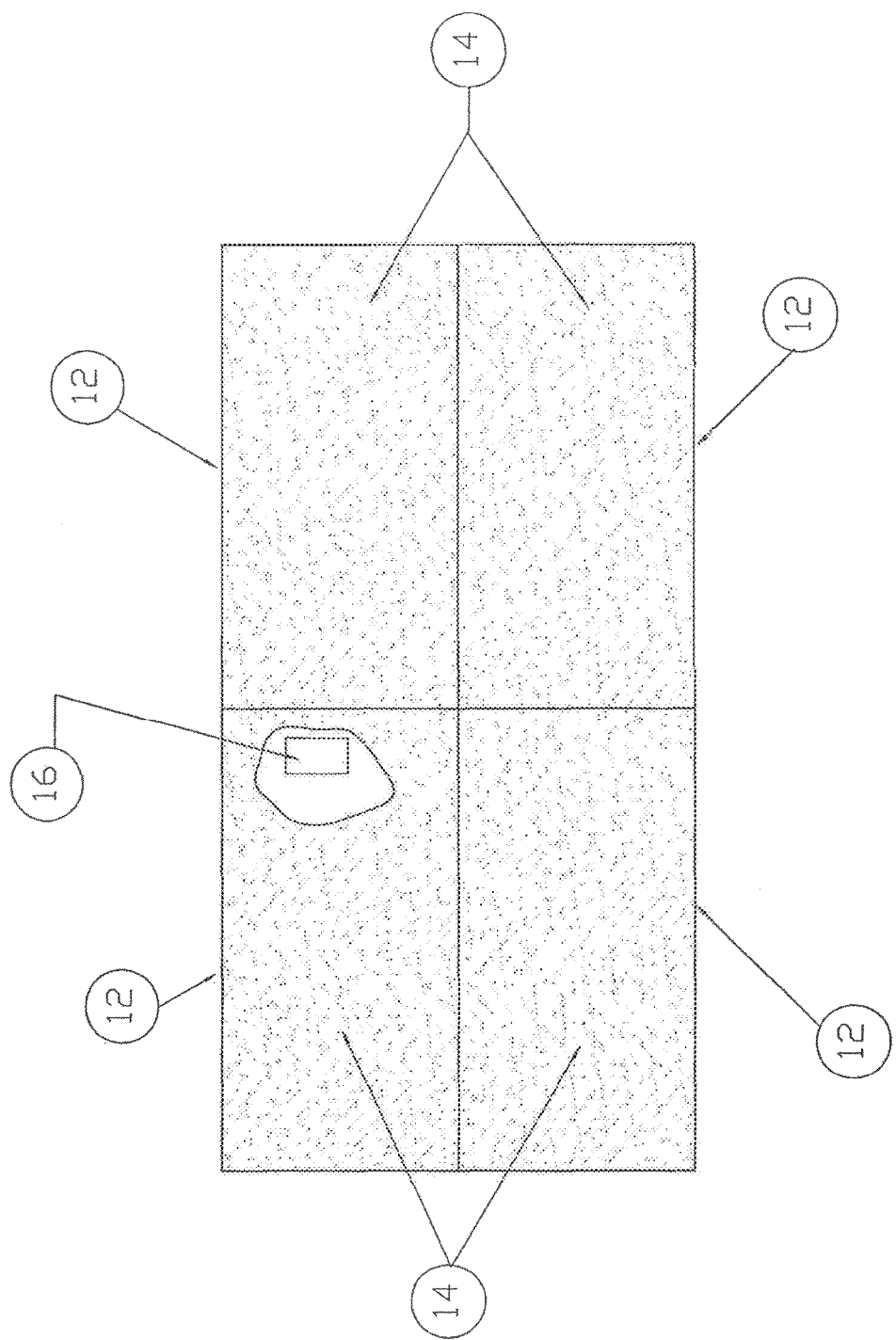
FIG. 3 is a front view illustrating a component of the present invention.
Figure 4:
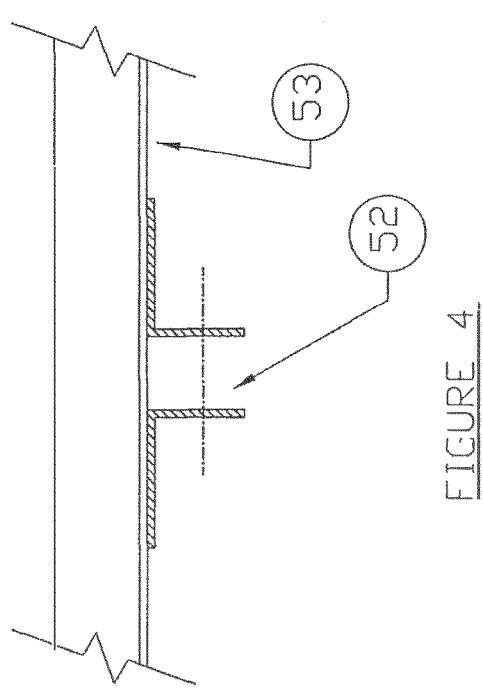
FIG. 4 is a partial cut-away view illustrating a component of the present invention.
Figure 5:
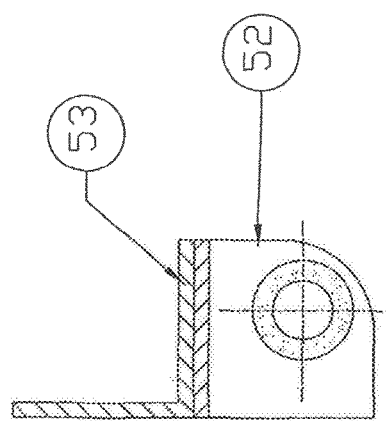
FIG. 5 is a detail view illustrating a component of the present invention.
Figure 6:
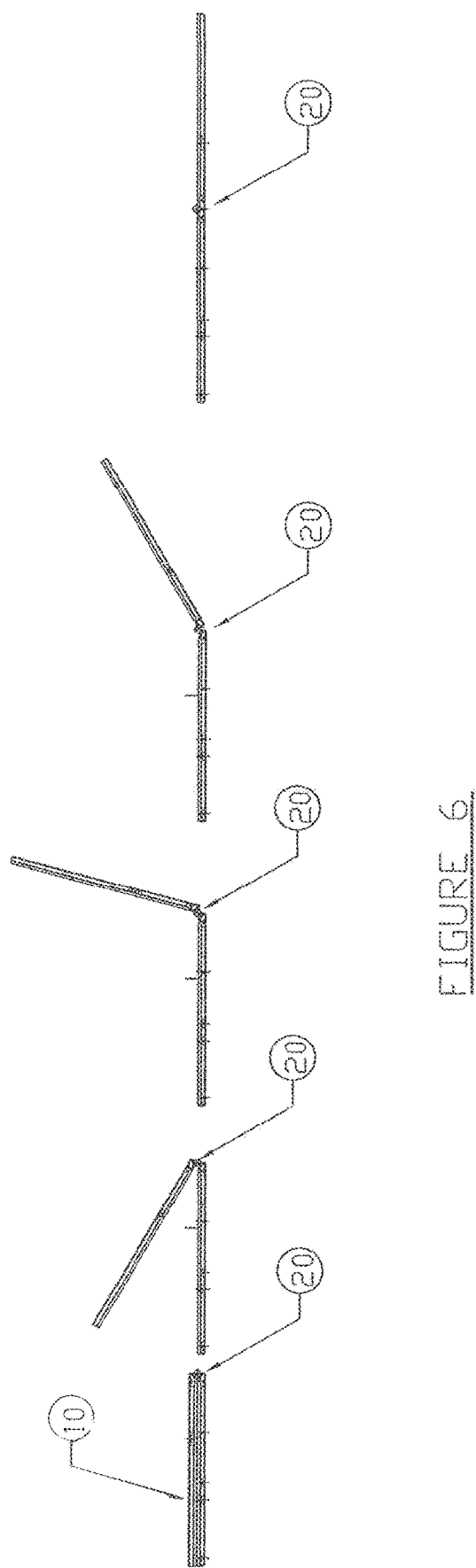
FIG. 6 is a side view illustrating an embodiment of the device of the present invention.
Figure 7:
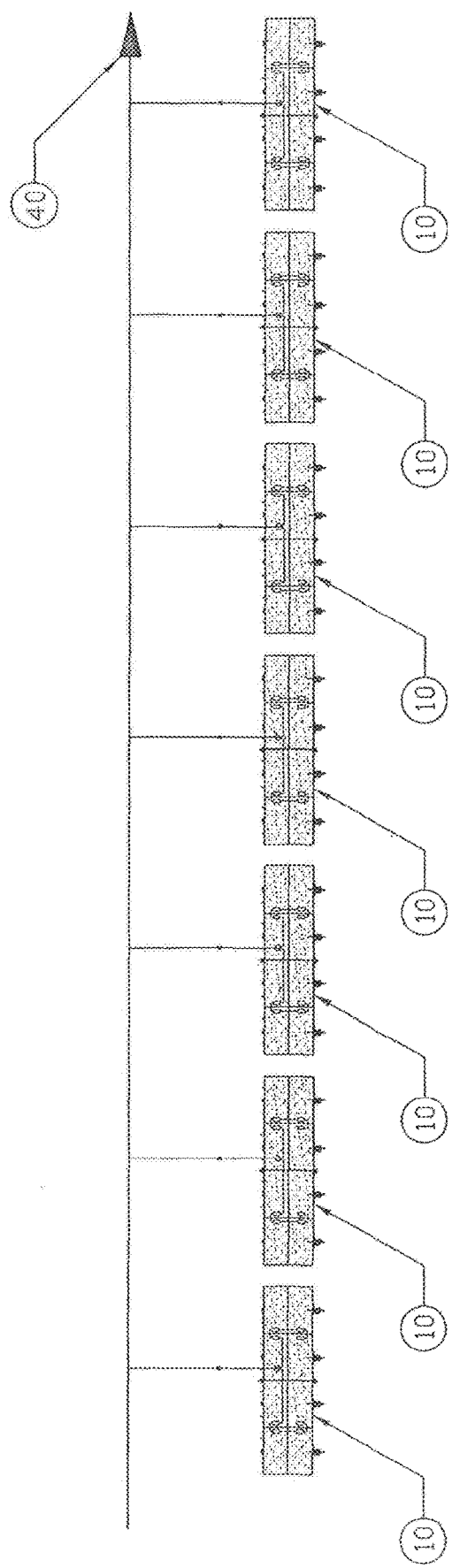
FIG. 7 illustrates an alternate installation of the present invention.
Figure 8:
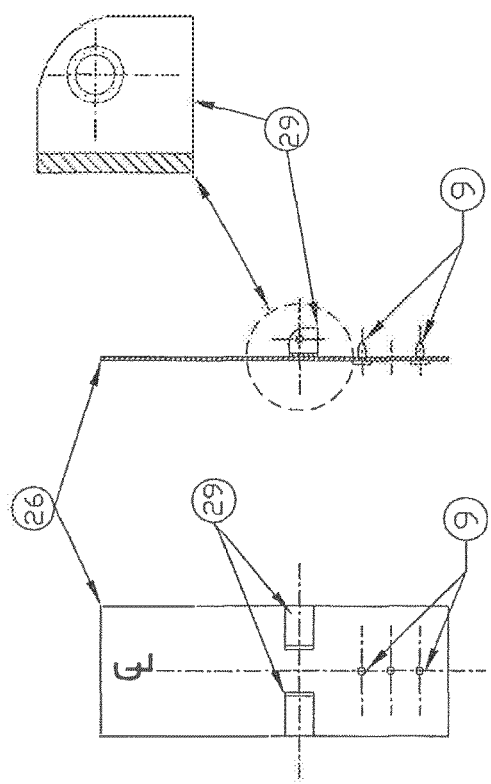
FIG. 8 is a detail view illustrating a component of the present invention.
Figure 9:
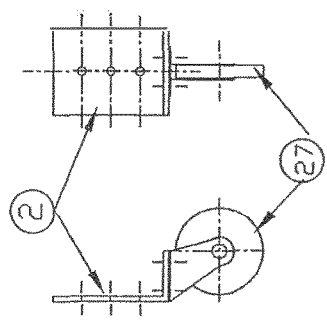
FIG. 9 is a detail view illustrating a component of the present invention.
Figures 11A, 11B:
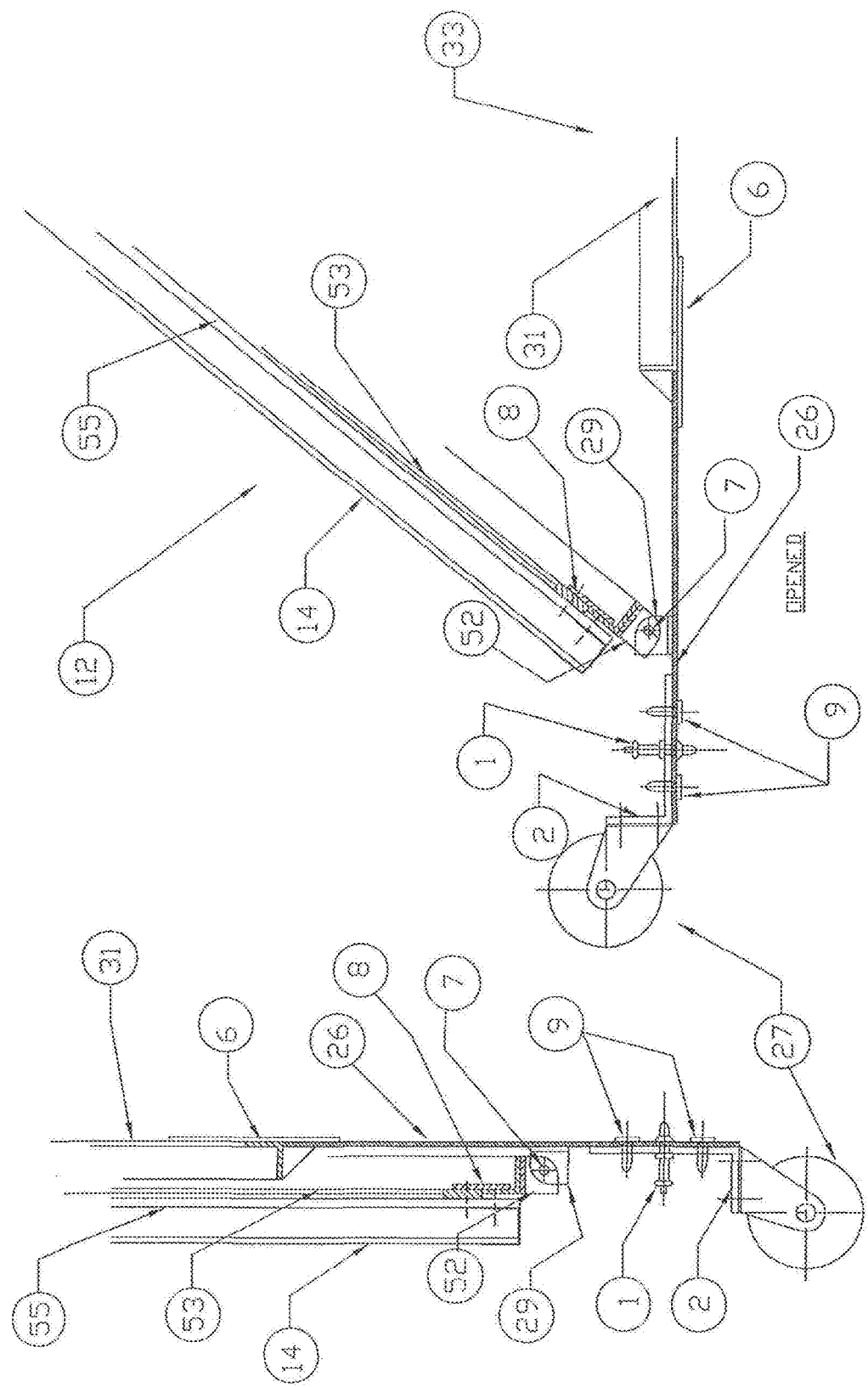
Figure 15A:
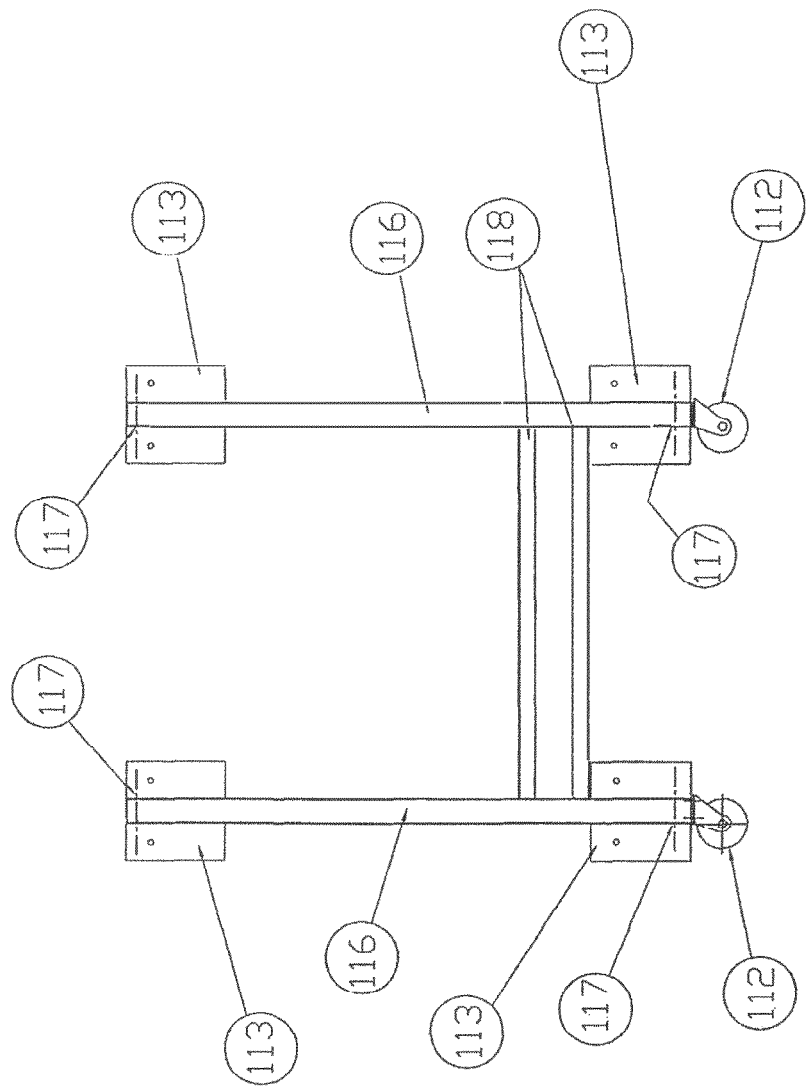
FIG. 15a is a rear view of a component of an alternate embodiment of the patent invention.
Figure 15B:
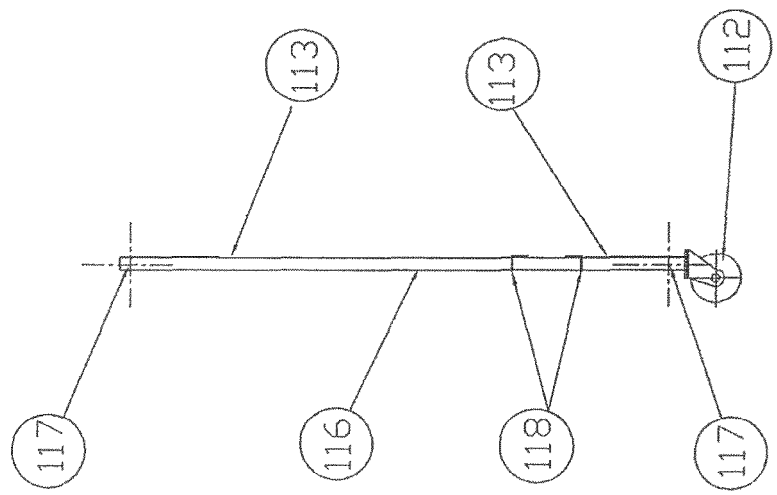
FIG. 15b is a side view of a component of an alternate embodiment of the present invention.
Figure 17B:
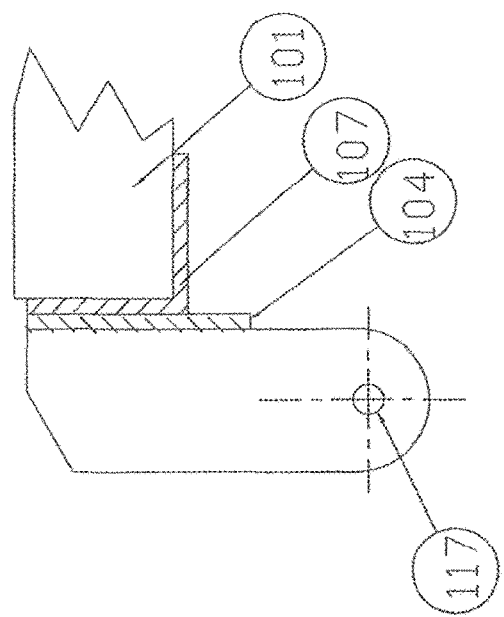
FIG. 17b is a detail view of a component of an alternate embodiment of the present invention.
Figure 17A:
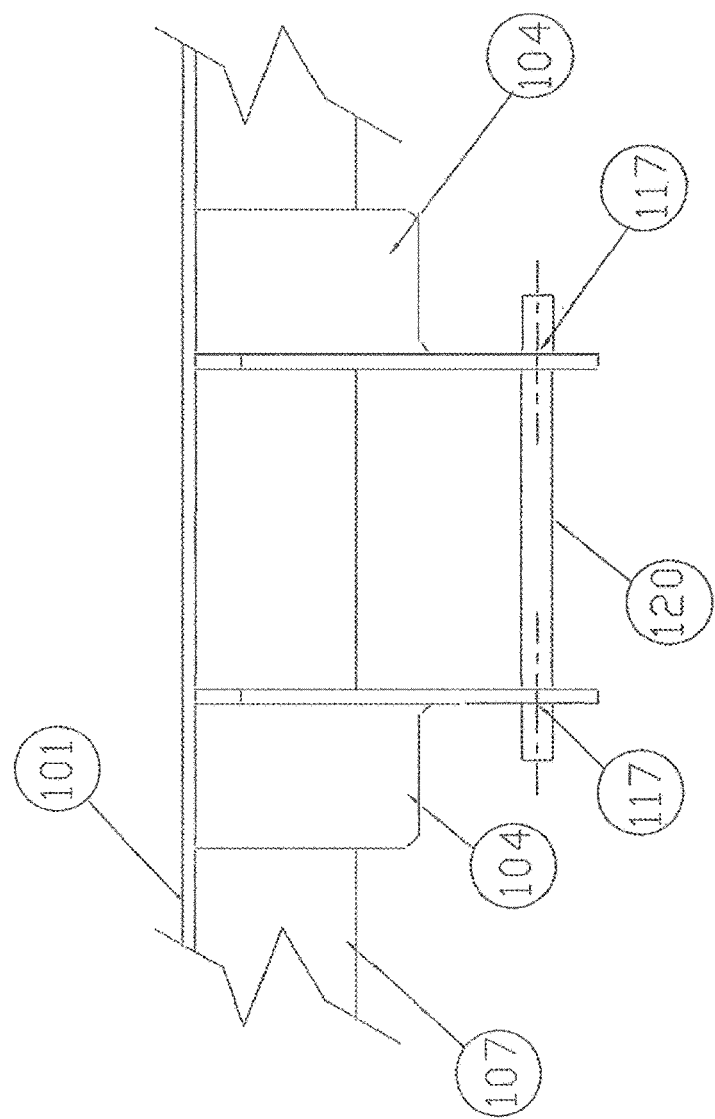
FIG. 17a is a detail view of a component of an alternate embodiment of the present invention.
Figure 19:
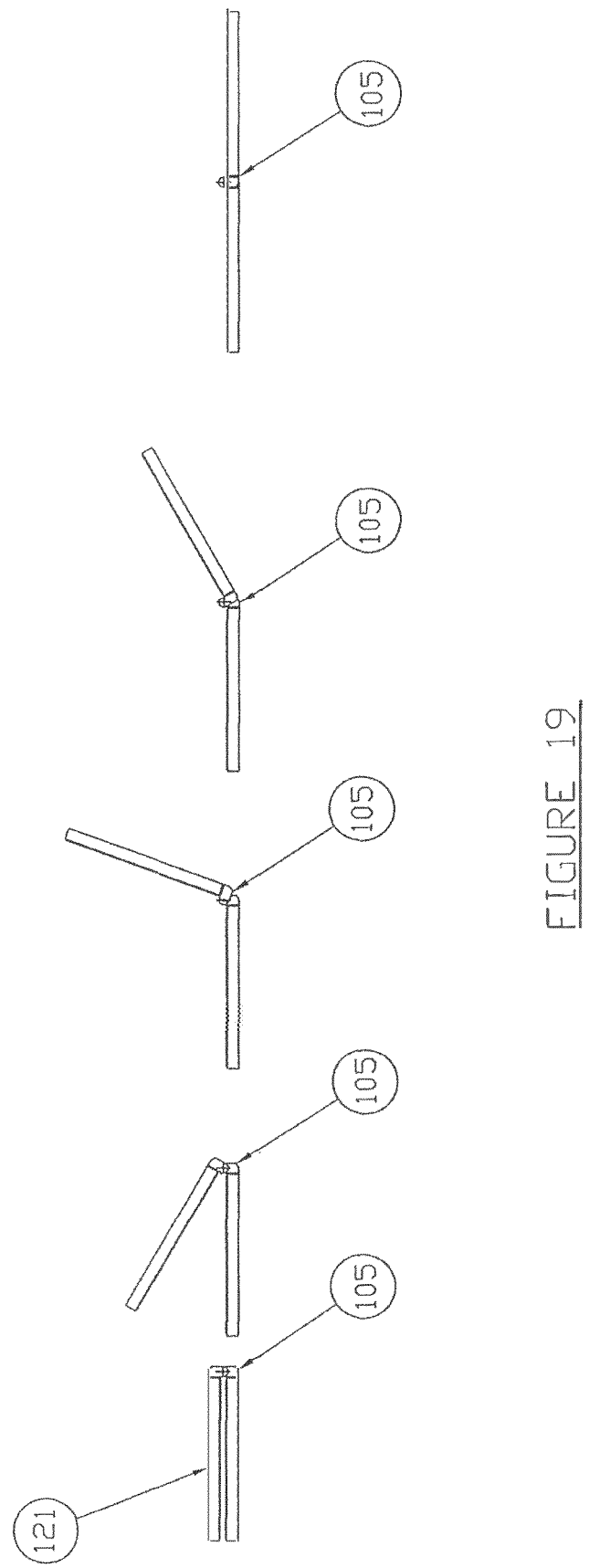
FIG. 19 illustrates the operation of a component of an alternate embodiment of the present invention.
Figure 20:
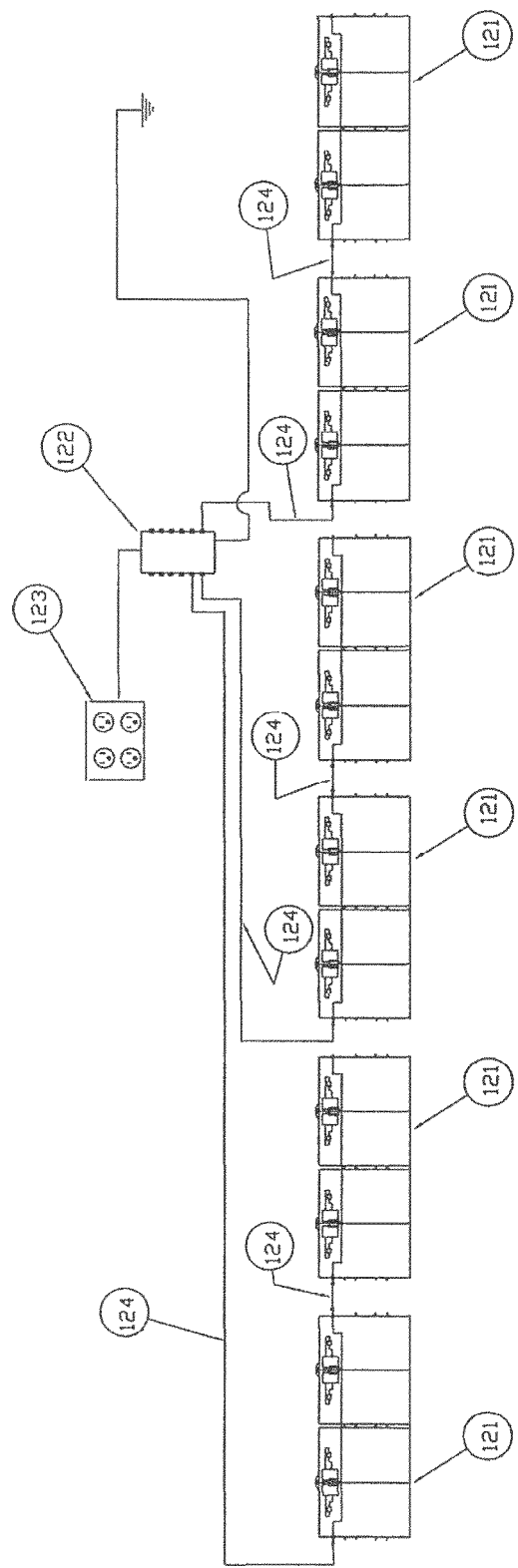
FIG. 20 is a plan view illustrating an installation of the alternate embodiment of the present invention.
Figure 21:
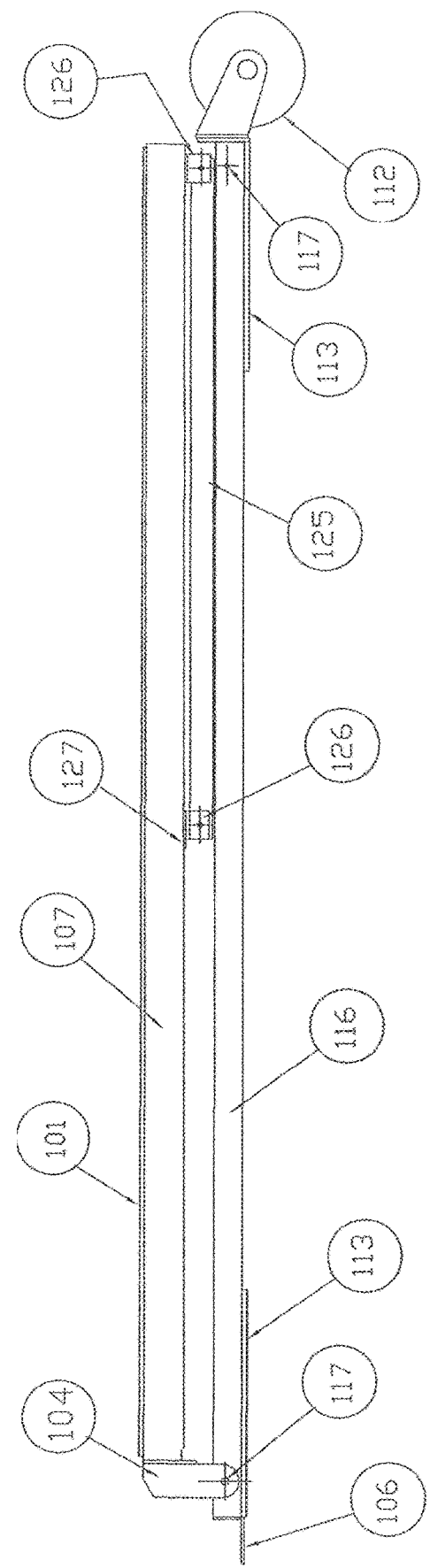
FIG. 21 is a side assembly view of the alternate embodiment of the present invention.
Figure 22:
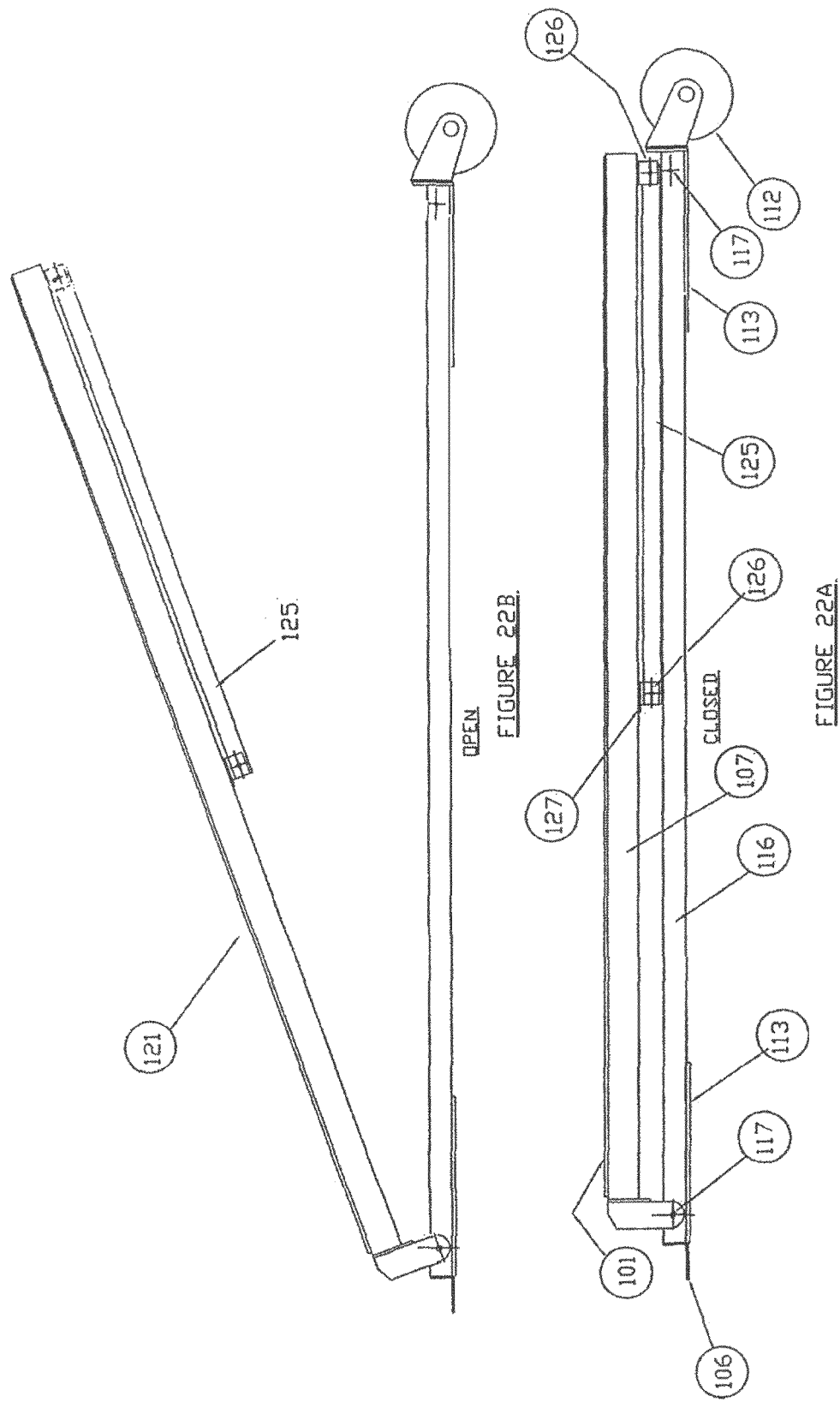
FIG. 22a is a side assembly view of the alternate embodiment of the present invention.
FIG. 22b is a side assembly view of the alternate embodiment of the present invention.
Figure 23:
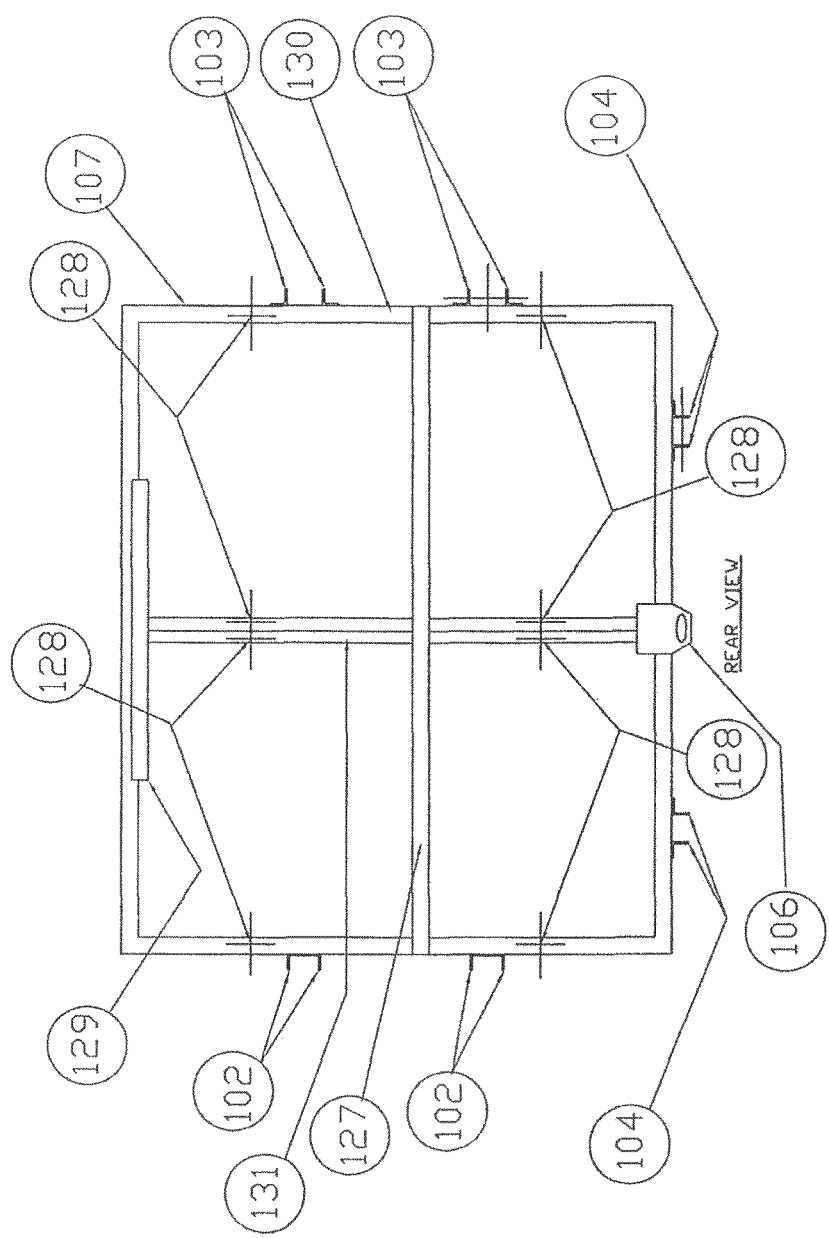
FIG. 23 is a plan view of a component of an alternate embodiment of the present invention.
Figure 24:
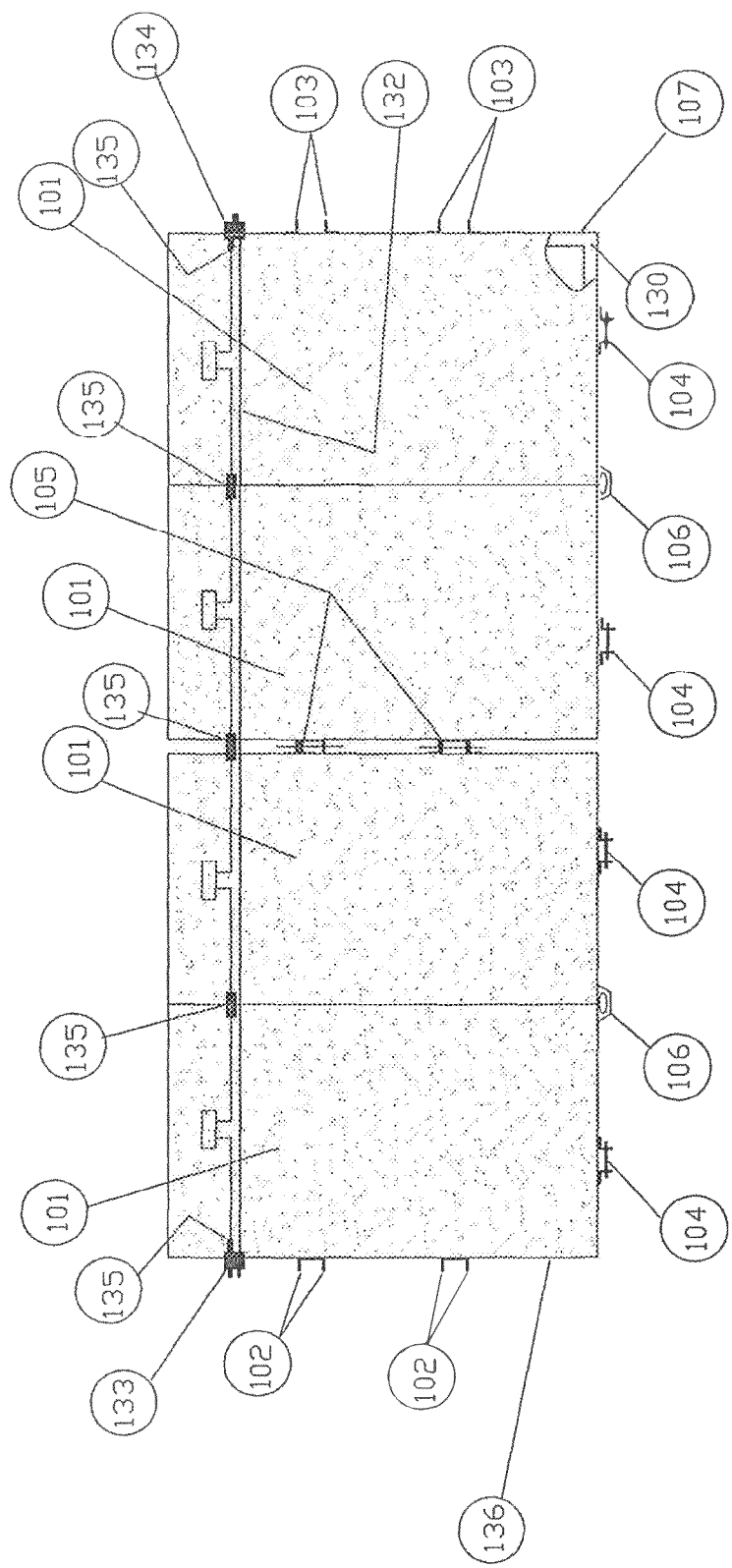
FIG. 24 is a partial assembly view component of an alternate embodiment of the present invention.
Figure 25:
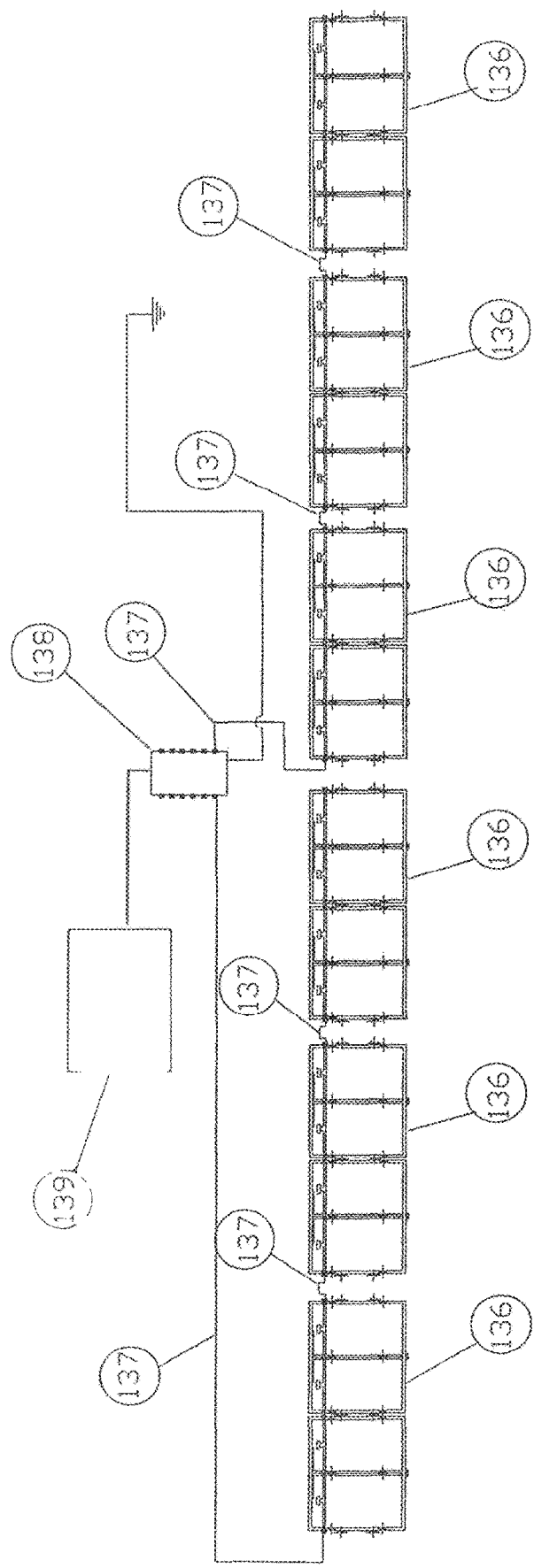
FIG. 25 is a plan view illustrating an installation of the alternate embodiment of the present invention.

This present Invention is a New Multiple Configurable Solar Photovoltaic Assembly created for installation method (s) by preassembling Photovoltaic Modules together using its Built-in Frame which, when unfolded, presents a labor-free installation suitable for Large Utility Grade Installations while eliminating over 95% of labor, ground site improvements and material handling. The Invention has built-in anti-theft devices, requires no tools and no added ballast for stability. This Invention will reduce construction time of a traditional megawatt installation by more than 90%.

The main elements of the present invention are:
1. Built-in Fold-out Windscreen.
2. Folded PPG creates an exoskeleton for the Photovoltaic Modules created by the combined Base Frame and Master Frame Weldment Assemblies.
3. Quick Release Quick Detachable No-Flat Caster Wheel Assembly as an Anti-theft adaptation.
4. Junction Box which offers the ability to go from an In-series Wiring Configuration providing high voltage with low amperage to an In-parallel Wiring Configuration providing low voltage with high amperage while providing a Clean Bonding Pass from the first of a twelve Photovoltaic Module String to a Distant Grounded Combiner/Inverter without any additional changes, adjustments or added parts after initial installation.

This Invention consists of a Master Frame Weldment Assembly with four 60-Cell Photovoltaic Modules attached and grounded to it. The Master Frame Weldment Assembly has two Junction Boxes, one located at each end of the opened Invention. The Invention has a Base Frame Assembly which is attached along the front side with four Hinge Assemblies. When in the fully-opened operational configuration, the Master Frame Weldment Assembly creates an appropriate angle-of-attack to the sun enabling a set of Support Channels to drop into place maintaining that position. Attached to the back of the Support Channels is a Thin Aluminum Sheet designed to act as a Built-in Fold-out Windscreen for the Invention.

The Internal Wiring of the Junction Box allows the Invention to go from an In-Series Wiring Configuration to an In-Parallel Wiring Configuration without any changes, adjustments or added parts. The Junction Box also allows for an Absolute Bonding Pass from the very first installed Photovoltaic Module in a string installation, to and beyond the last module in a string installation and ultimately to a Grounded Combiner/Inverter. When taken offline from a Large Utility Grade Installation Site to be used at another site as an Emergency DC Power Supply for Battery Backup Energy Storage and Supply System, the Bonding Pass continues and remains true to a Grounded Battery Backup Enclosure.

This Invention has the ability to be removed from a previously wired In-Series Wiring Configuration Large Utility Grade Installation by folding into its travel configuration and transported to where emergency power is needed. It can be quickly and easily opened, and with its ability to also be wired in an In-parallel Wiring Configuration for low voltage and higher amperage, it can be plugged into a Battery-Powered Companion Unit to immediately deliver AC power where and when needed.

When the Invention is fully closed and standing on its Swivel Caster Wheels, the Base Frame fully encapsulates the Master Frame Weldment Assembly as a protective skeletal covering. In addition, the Photovoltaic Modules are tucked inside the Master Frame Weldment Assembly, facing each other, offering added protection for the Photovoltaic Modules by the outside of the Master Frame Weldment Assembly.

PPG In-Series to In-Parallel Cabling

The PPG can be strung together as multiple units connected electronically in either an In-Series Wiring Configuration or an In-Parallel Wiring Configuration.

When strung together in an In-series Wiring Configuration, the PPG is limited to three PPG'S in a string. This Configuration will result in an electrical deliverance of high voltage and low amperage which is well-suited for commercial inverters when used in Large Utility Grade Installations.

When strung together in an In-parallel Wiring Configuration, the PPG can have multiple PPGS in a string. This configuration will result in an electrical deliverance of low voltage and high amperage which is well suited for a Battery Backup Energy Storage and Supply System when used in emergency power conditions. This conversion is achieved with the unique wiring design in the Junction Boxes of the Invention and a simple Trunk Cable manipulation.

By having the ability to quickly and easily go from an In-series Wiring Configuration to an In-parallel Wiring Configuration without any onsite changes, adjustments or added parts, the PPG fulfills its primary design function of being able to be used in a Large Utility Grade Installation, making power while waiting for a call to assist an offsite emergency. When there is a call for an offsite emergency, multiple PPGS can be taken offline, folded into their Travel Configuration and be ready for rapid deployment to bring emergency power to an offsite location where emergency power is needed. When at the Emergency Site, the PPG quickly and easily reconfigures to the In-parallel Wiring Configuration for deliverance of low voltage and high amperage which is necessary for battery backup energy storage systems to deliver emergency power to the end user. All of this requires no additional changes, added parts or any further adjustments beyond the initial installation, providing true Plug-And Play Technology.

DETAILED DESCRIPTION OF THE INVENTION

PPG In-Series to In-Parallel Cabling

This present invention will now be described in terms of the presently preferred embodiment thereof as illustrated in the appended drawings. Those of ordinary skill will recognize that obvious modifications may be made thereto without departing from the scope of the present invention.

The PPG can be strung together as multiple units connected electronically in either an In-series Wiring Configuration or an In-parallel Wiring Configuration.

When strung together in an In-series Wiring Configuration, the PPG is limited to three PPGS in a string. This Configuration will result in an electrical deliverance of high voltage and low amperage which is well-suited for commercial inverters when used in Large Utility Grade Installations.

When strung together in an In-parallel Wiring Configuration, the PPG can have two PPGS in a string. This configuration will result in an electrical deliverance of low voltage and high amperage which is well suited for a Battery Backup Energy Storage and Supply System when used in emergency power conditions. This conversion is achieved with the unique wiring design in the Junction Boxes of the Invention and a simple Trunk Cable manipulation.

By having the ability to quickly and easily go from an In-series Wiring Configuration to an In-parallel Wiring Configuration without any onsite changes, adjustments or added parts, the PPG fulfills its primary design function of being able to be used in a Large Utility Grade Installation, making power while waiting for a call to assist an offsite emergency. When there is a call for an offsite emergency, multiple PPGS can be taken offline, disconnected from their Trunk Cables, which are left behind, folded into their Transport Configuration and be ready for rapid deployment to bring emergency power to an offsite location where emergency power is needed. When at the Emergency Site, the PPGS are quickly and easily reconfigured to the In-Parallel Wiring Configuration for deliverance of low voltage and high amperage which is necessary for battery backup energy storage systems to deliver immediate emergency power to the end user. All of this requires no tools, no additional changes, no added parts or any further adjustments beyond the initial installation, other than the provided In-Parallel trunk cable, providing true Plug-And Play Technology.

The PPG has a Built-in Fold-out Windscreen which requires no additional changes, tools, added parts or any further adjustments and eliminates the need for ballast in most locations, thus allowing for quick and easy installation time by reducing the need for additional material or equipment to store or install. As the PPG is opened into its Operating Configuration, the Built-in Fold-out Windscreen automatically opens in place. When the PPG is taken offline and folded into its Travel Configuration, the Built-in Fold-out Windscreen, without having to be touched, automatically folds back into place.

The PPG has four Swivel Caster Wheels, which also act as an anti-theft device by making it difficult to remove the 250 pound PPG without its wheels. The Quick Release Quick Detachable No-Flat Caster Wheel Assembly is comprised of Swivel Caster Wheels each of which are attached to a self-locating mounting box that is held in place by two Positive Locking Pins. When the PPG is located, opened and operating, the two Positive locking Pins are pulled from each self-locating mounting box and removed, thus allowing the quick release of each Quick Release Quick Detachable No-Flat Caster Wheel Assembly to be quickly and easily detached and stored. If and when the PPG needs to be relocated, the self-locating mounting box is easily slipped into place and, with the two Positive Locking Pins reinserted in each, the PPG is again instantly ready for rapid deployment to another location; whether back into its original Large Utility Grade Installation or at another needed Emergency location.

This present Invention is a New Multiple Configurable Solar Photovoltaic Assembly created for installation method (s) by preassembling Photovoltaic Modules together using its Built-in Frame which, when unfolded, presents a labor-free installation suitable for Large Utility Grade Installations while eliminating over 95% of labor, ground site improvements and material handling. The Invention has built-in anti-theft devices, requires no tools and no added ballast. This Invention will reduce construction time of a traditional megawatt installation by more than 90%.

The main elements of the present invention are:

1. Built-in Fold-out Windscreen
2. Folded PPG which has a skeletal protective covering from Base Frame and Master Frame for the Photovoltaic Modules
3. Quick Release Quick Detachable No-Flat Caster Wheel Assembly as an Anti-theft adaptation
4. Junction Box which offers the ability to go from an In-Series Wiring Configuration providing high voltage with low amperage to an In-Parallel Wiring Configuration providing low voltage with high amperage while providing a Clean Bonding Pass from the first of a twelve Photovoltaic Module String to a Distant Grounded Combiner/Inverter without any additional changes, adjustments or added parts after initial installation.

This Invention consists of a Master Frame Weldment Assembly with Four 60-Cell Photovoltaic Modules attached and grounded to its Master Frame Weldment Assembly. The Master Frame Weldment Assembly has two Junction Boxes, one located at each end of the opened Invention. The Invention has a Base Frame Assembly which is attached along the front side with Four Hinge Assemblies. When in the fully-opened operational configuration, the Master Frame Weldment Assembly creates an appropriate angle-of-attack to the sun enabling a set of Support Angles to drop into place maintaining that position. Attached to the back of the Support Angles is a Thin Aluminum Sheet designed to act as a Built-in Fold-out Windscreen for the Invention.

The Internal Wiring of the Junction Box allows the Invention to go from an In-Series Wiring Configuration to an In-Parallel Wiring Configuration without any changes, adjustments or added parts. The Junction Box also allows for an Absolute Bonding Pass from the very first installed Photovoltaic Module in a string installation, to and beyond the last module in a string installation and ultimately to a Grounded Combiner/Inverter. When taken offline from a Large Utility Grade Installation Site to be used at another site as an Emergency DC Power Supply for Battery Backup Energy Storage and Supply System, the Bonding Pass continues and remains true to a Grounded Battery Backup Enclosure.

This Invention has the ability to be removed from a previously wired In-series Wiring Configuration Large Utility Grade Installation by folding into its travel configuration and transported to where emergency power is needed. It can be quickly and easily opened, and with its ability to also be wired in an In-parallel Wiring Configuration for low voltage and higher amperage, it can be plugged into a Battery-Powered Companion Unit to immediately deliver AC power where and when needed.

When the Invention is fully closed and standing on its Swivel Caster Wheels, the Base Frame fully encapsulates the Master Frame Weldment Assembly as a protective skeletal covering. In addition, the Photovoltaic Modules are tucked inside the Master Frame Weldment Assembly, facing each other, offering added protection for the Photovoltaic Modules by the outside of the Master Frame.

Overview

The PPG can be wired in both an In-Series Wiring Configuration and In-Parallel Wiring Configuration without making any physical changes to the PPG'S mechanical or electrical components. (See FIG. #1 26)

All Photovoltaic Modules use a WEEB-type washer to create a Bonding Pass to the PPG Frame.

The PPG Junction Boxes, at each end of the PPG, use WEEB-type Washers to pick up the Ground Current from the Master Frame Weldment Assembly and pass it through the Cover Plate, via the Ground Lug that is pressed into the Cover Plate, to a wire that is spliced into the Ground Wire which runs from the #5 pin of each of the External Five Pin Connectors. This allows for the passing of the Ground Current through the Internal Trunk Cable of each PPG enabling a bonding pass from the first Junction Box in a string of three PPG units to an Interconnecting Trunk Cable running to a Grounded Combiner when being wired in an In-Series Wiring Configuration for a Large Utility Grade Installation. (See FIGS. #3 28, #4 29, #5 30).

Junction Box and Internal Wiring

Each Junction Box has two Female 5-Pin Connectors, a Photovoltaic Connector and a Ground Lug that is pressed into the Cover Plate. There are two Positive Wires, two Negative Wires and one Ground Wire passing from an Outside Connector on the side of the Junction Box to an Outside Connector on the top of the Junction Box. (See FIG. #3 28).

A wire attached to the Ground Lug that is pressed into the Lid of each Junction Box is spliced into the Ground Wire that runs through each Junction Box. (See FIG. #3 28)

The side-mounted Cable Glands receive a 5-Conductor Internal Cable that runs from one Junction Box to the other. There is a Photovoltaic-type Connector on the Side of each Junction Box.

In the Junction Box-Right Side, there is a Negative Photovoltaic Connector that receives the Current from the Positive Photovoltaic Connector of the Photovoltaic Module and the wire from the Negative Connector splices into the #1 wire inside the Junction Box. (See FIGS. #3 28, #4 29).

In the Junction Box-Left Side, there is a Positive Photovoltaic Connector that receives the Current from the Negative Photovoltaic Connector of the Photovoltaic Module and the wire from the Positive Connector splices into the #4 wire inside the Junction Box. (See FIGS. #3 28, #4 29).

Starter Plug

Inside the Starter Plug is a Wire attached between the #1 and #2 pins. (See FIG. #2 27).

Inside the Starter Plug is a Wire attached between the #3 and #4 pins. (See FIG. #2 27).

In-Series Wiring Configuration

The Trunk Cable for a String Installation wired in an In-Series Wiring Configuration has a Female 5-Pin Connector at each end and is Color-coded with one Connector being Clear and the other Connector in color. (See FIG. #5A 30A).

In the Trunk Cable for a string installation wired in an In-Series Wiring Configuration, the wire from the #4 pin on the Clear Side will attach to the #1 pin on the Color Side. (See FIG. #5A 30A)

The Trunk Cable for a String Installation wired in an In-Series Wiring Configuration will not have a wire attached to the #1 pin in the connector on the Clear Side or the #4 pin in the connector on the Color Side. (See FIG. #5A 30A)

The current through the #2, #5 and #3 pins in the Trunk Cable of a 3 PPG string that is wired in an In-Series Wiring Configuration will never be interrupted. (See FIGS. #5 30, #5A 30A, #6 31, #7 32)

By using the Starter Plug on the right side, when viewed from the back, the positive current goes from the #1 pin to the #2 pin in the Starter Plug and the #2 wire carries the positive current to the left side of the end of the third PPG unit. (See FIGS. #2 27, #5 30, #7 32)

By using the Starter Plug on the left side, when viewed from the back, the negative current goes from the #4 pin to the #3 pin in the Starter Plug and the #3 wire carries the negative current to the right side of the end of the third PPG unit. (See FIGS. #2 27, #5 30, #6 31)

Two In-series Wiring configuration Trunk Cables consisting of a 4-conductor wire with a Color-Coded Connector on one side, are provided for every three PPG units wired in an In-series Wiring Configuration. (See FIG. #5A 30A)

In-Parallel Wiring Configuration

There are no changes required when connecting two PPGS in an In-parallel Wiring Configuration after having been connected in a three PPG In-series Wiring Configuration to one another. (See FIG. #8 33)

No Starter Plug is required when two PPG units are connected in an In-parallel Wiring Configuration. (See FIG. #8,33) The parallel trunk cable is a 3-conductor 12 AWG wire. (See FIG. #8 33)

Built-In Fold-Out Windscreen

The PPG, when lying on the ground in the open position, is ready to have the upper surface raised to the solar production angle of attack to the sun as the final step of setting up. (See FIG. #12 37)

With one person in back of Each Section (there are two Photovoltaic Modules in each Section) the Upper Level containing Photovoltaic Modules is lifted to its full operational position. (See FIG. #12 37)

As the top Photovoltaic Portion of each Section goes up, Support Channels of each Section unfold and drop down to support the top Photovoltaic Side in place. (See FIG. #12 37)

Attached to the Support Channels is a Thin Aluminum Sheet covering the whole exposed open rear area between the Upper Master Frame Weldment Assembly containing Photovoltaic Modules and the Lower Base Frame.

The positioned Thin Aluminum Sheet now becomes the Unfolded Windscreen; keeping the wind from getting under the Master Frame Weldment Assembly with the Modules while Reducing the Need for Ballast. (See FIGS. #9 34, #10 35, #11 36, #12 37)

When the PPG is required to relocate to Another Site, the PPG is first Disconnected from the Load, closed, and with its Windscreen Folded between the Base Frame Assembly and the Master Weldment Frame Assembly, is standing on its Swivel Caster Wheels in its Travel Configuration, ready for Rapid Deployment to where power is needed. (See FIGS. #9 34, #11 36, #12 37)

Anti-Theft Quick Release Quick Detachable No-Flat Caster Wheel Assembly

All four Swivel Caster Wheels (54) are individually attached to a Quick Release Quick Detachable No-Flat Caster Wheel Assembly (55) that locate to the Channel End Plate and Caster Wheel Holding Bracket Assembly (75) (FIGS. #34, #37, #38) that is designed to receive two Positive Locking Pins each, to secure the Quick Release Quick Detachable No-Flat Caster Wheel Assembly (55) in place.

There are four Channel End Plates and Caster Wheel Holding Bracket Assemblies (75) in each PPG, one attached to the end of each Base Frame Extrusion (53) (See FIGS. #34, #37, #38)

Push-Bar

The PPG is in its open V-shaped traveling configuration and locked in place by one or two Diagonal Push Bar(s) (83) when on-site transport is necessary. Each of two Base Frame Extrusions (53) contain a Diagonal Push-Bar (83) stored and held in place by a Quick Release Pin (82). One Diagonal Push-Bar (83) is sufficient for traveling on smooth terrain as where two Diagonal Push-Bars (83) would be required/recommended for rough terrain conditions. The two Diagonal Push Bars (83) place the PPG in an extremely stable traveling configuration enabling one person to easily move the total culmination of over 200 pounds of four 60 Cell Photovoltaic Modules (39), the Master Frame Weldment Assembly (35) and the Base Frame Assembly (70) in rural conditions to a predetermined location. Four Swivel Caster Wheels (54) allow the PPG to easily navigate on both rough and smooth terrain conditions.

First Embodiment

The PPG has two Master Frame Weldment Assembly (35) consisting of one Right Side Vertical Angle (60), one Left Side Vertical Weldment (61), one Upper Horizontal Weldment (58), one Lower Horizontal Weldment (59) and one "T" Extrusion (69). Each Master Frame Weldment Assembly (35) contains two 60 Cell Photovoltaic Modules (39). Each 60 Cell Photovoltaic Module (39) has two Wires, one a Negative Current Source Wire (20) and the other a Positive Current Source Wire (21). The Negative Current Source Wire (20) of one 60 Cell Photovoltaic Module (39) connects to the Positive Current Source Wire (21) of the other.

Each Master Frame Weldment Assembly (35) has a series of hinges and brackets attached to the Right Side Vertical Weldment (60) and the Left Side Vertical Weldment (61), and to the Upper Horizontal Weldment (58) and the Lower Horizontal Weldment (59). On the Right Side Vertical Weldment (60) and the Left Side Vertical Weldment (61) are Open Side Hinges (73) and Closed Side Hinges (74). On the Left Side Vertical Weldment (61) are two sets of Open Side Hinges (73) and on the Right Vertical Weldment (60) are two sets of Closed Side Hinges (74). The Open Side Hinges (73) and Closed Side Hinges (74) are located in a way that when two Master Frame Weldment Assemblies (35) are placed side-by-side, the Closed Side Hinges (74) will fit inside the Open Side Hinges (73). Then, by using two Quick Release Pins (82) and two Axle Bolts, the two Master Frame Weldment Assemblies (35) are connected in a way that allows them to be opened for solar generation and closed for transport.

When the two Master Frame Weldment Assemblies (35) are in an Open Position, and each side-by-side Master Frame Weldment Assembly (35) contains two 60-Cell Photovoltaic Modules (39) making four 60-Cell Photovoltaic Modules (39) side-by-side, and each Negative Current Source Wire (20) of one 60 Cell Photovoltaic Module (39) will connect with the Positive Current Source Wire (21) from the next 60 Cell Photovoltaic Module (39). Now, with the two Master Frame Weldment Assemblies (35) in the open position, each having two 60 Cell Photovoltaic Modules (39), the result is four 60 Cell Photovoltaic Modules (39) all wired together creating a Photovoltaic Module Connection of Negative to Positive In-series Circuitry (36).

At the top of the Master Frame Weldment Assembly (35) are two sets of Master Frame Weldment Assembly Hinges (52) and a Lifting Bracket (68), all welded to the Upper Horizontal Weldment (58). The Lifting Bracket (68) allows the PPG to be carried in a closed configuration by helicopter or crane to higher elevation and/or remote locations. The two Master Frame Weldment Assembly Hinges (52) allow the Master Frame Weldment Assembly (35) to be attached to the Base Frame Extrusion (53) by aligning the Master Frame Weldment Assembly Hinges (52) with the mounting holes located in the Base Frame Extrusions (53). Now, by using an axle bolt, each Master Frame Weldment Assembly (35) is attached to each Base Frame Assembly (70).

Each Base Frame Assembly (70) is comprised of two Base Frame Extrusions (53) with Stabilizers (63) welded to each end of every Base Frame Extrusion (53). At the far end of the Base Frame Assembly (70), the opposite end of where the Master Frame Weldment Assembly (35) is hinged to the Base Frame Assembly (70), are a set of two Ballast Rack Angles (65) that connect the two side-by-side Base Frame Extrusions (53), tying them together. The result is each Base Frame Assembly (70) is made up of two Base Frame Extrusions (53) with four Stabilizers (63), one at each end. Each of the four Stabilizers (63) has a removable Claw (67) attached to it. The Claws (67) are attached to the Stabilizer (63) with a welded-channel on one side and a removable Clevis Pin (66) on the other. Each Claw (67) has 12 protrusions sticking out of the bottom that will allow the Base Frame Assembly (70), when laying-on/penetrating the ground, to be held in place under high winds and seismic adverse conditions. There are two Base Frame Assemblies (70) in each PPG, resulting in eight Stabilizers (63) and eight Claws (67) which contribute to the overall stability of the PPG.

On the underside of the Lower Horizontal Weldment (59) of the Master Frame Weldment Assembly (35) is a series of four Support Channel Hinges (51), which receive two Support Channel Assemblies (47) and two Windscreen Stiffeners (46), all meant to support the Built-in Fold-Out Windscreens-Left Side (48) and Built-in Fold-out Windscreens-Right Side (62). The Built-In Fold-out Windscreens-Left Side (48) and Built-in Fold-out Windscreens-Right Side (62) are spot-welded to the two Windscreen Stiffeners (46) and two Support Channel Assemblies (47). There is a Formed Kick Channel (50) at the very bottom and top of the Built-in Fold-out Windscreen-Left Side (48) and Built-in Fold-out Windscreen-Right Side (62), which is used to add strength and get the Built-in Fold-out Windscreen-Left Side (48) and Built-in Fold-out Windscreen-Right Side (62) in motion when going into the folded configuration. The Built-in Fold-out Windscreen-Left Side (48) has a cutout meant to receive a Junction Box-Left Side (17) on the extreme left side and the Built-in Fold-out Windscreen-Right Side (62) has a cutout meant to receive a Junction Box-Right Side (12) on the extreme right side of the Built-in Fold-out Windscreen Right Side (62). At the bottom of each of the two Support Channel Assemblies (47) is a Plastic Guide Rod (49) with Sealed Ball Bearings (57), one on each end of the Plastic Guide Rod (49) that travel through each Base Frame Extrusion (53) when going from an open working configuration to a closed travel configuration.

Second Embodiment

The PPG stands on a set of four Swivel Caster Wheels (54) in its closed travel configuration. In this position, the PPG is locked shut in two places by having a Quick Release Pin (82) connecting an Open Side Hinge (73) to a Closed Side Hinge (74) in two different upper and lower locations of the PPG. Also in this configuration, the exoskeleton frame comprised of the Master Frame Weldment Assembly (35) and the Base Frame Assembly (70), protects the 60-Cell Photovoltaic Modules (39) that face each other inside the Master Frame Weldment Assembly (35). To open the PPG, first remove the two Quick Release Pins (82) connecting the Open Side Hinge (73) to the Closed Side Hinge (74). With the Quick Release Pins (82) removed, open the PPG by separating the two Master Frame Weldment Assemblies (35) about three feet apart. On the side of two separate Base Frame Extrusions (53) are the two stored Diagonal Push-Bars (79) which are attached to two separate Base Frame Extrusions (53) and each held in place by a Quick Release Pin (82) at the center of the Diagonal Push-bar (83). Release and place one Diagonal Push-Bar (83) on top of the upper Open Side Hinge (73) located on the Master Frame Weldment Assembly (35) where it can be locked in place by a Quick Release Pin (82). Place the other end of the Diagonal Push-Bar (83) on top of the lower Closed Side Hinge (74) and lock it in place with a Quick Release Pin (82). Now, the PPG is in a spread-out V-shaped stable configuration and can be relocated simply by firmly grabbing the locked-in-place Diagonal Push-Bar (83), and pushing and steering the PPG to a predetermined location. A second Diagonal Push Bar (83) can be used for added stability on rough terrain by locating one end of the second Diagonal Push Bar (83) on top of the upper Closed Side Hinge (74) and locked in place with a Quick Release Pin (82) and locating the other end of the second Diagonal Push Bar (83) on top of the lowered Opened Side Hinge (73).

When at the designated location, release the Diagonal Push-Bars (83) by removing the Quick Release Pin (82). Relocate the Diagonal Push-Bars (83) to the Base Frame Extrusions (53) with the Quick Release Pins (82). Pull the two Master Frame Weldment Assemblies (35) together and lay the PPG down, going away from the sun.

With the PPG lying flat on the ground, both Master Frame Weldment Assemblies (35) are lying on the ground, one on top of the other and hinged at one side. Then, lift the upper Master Frame Weldment Assembly (35) up, and pivot it over to the other side of the lower Master Frame Weldment Assembly (35) that is lying on the ground so that the two Master Frame Weldment Assemblies (35) are now in an open side-by-side configuration.

Remove the two quick release pins locking each Master Frame Weldment Assembly (35) to each Base Frame Assembly (70). Now, with two people each standing in between the Swivel Caster Wheels (54) of each Master Frame Weldment Assembly (35) and standing in the center of each Master Frame Weldment Assembly (35), slowly lift the Master Frame Weldment Assembly (35). When doing this, the Master Frame Weldment Assembly (35) can only go as high as the Built-in Fold-out Windscreen-Right Side (62) and Built-in Fold-out Windscreen-Left Side (48) will allow. Once the Master Frame Weldment Assembly (35) is positioned as high as it can go and the Built-in Fold-out Windscreen Right Side (62) and Built-in Fold-out Windscreen Left Side (48) are fully deployed, take the two quick release pins that previously locked the Master Frame Weldment Assembly (35) to the Base Frame Assembly (70) and insert each pin into a locking hole on the Base Frame Extrusions (53) which will prevent the Master Frame Weldment Assembly (35) from accidentally closing. Now the Built-in Fold-out Windscreen-Right Side (62) and Built-in Fold-out Windscreen-Left Side (48) are facing out and one DC connector located on the outside of Built-in Fold-out Windscreen-Right Side (62) and Built-in Fold-out Windscreen-Left Side (48) are waiting to be connected to a trunk cable to provide DC power to its end user.

Third Embodiment

The PPG is made in two exact sections. Each section has a Master Frame Weldment Assembly (35). In the center of each Upper Horizontal Weldment (58) is a Lifting Bracket (68) allowing the PPG to be relocated from ground level location to a higher or remote location. On either side of the Lifting Bracket (68) are a set of Master Frame Weldment Assembly Hinges (52). Each set of Master Frame Weldment Assembly Hinges (52) are connected, using an axle bar, to a Base Frame Extrusion (53). All Base Frame Extrusions (53) have a Stabilizer (63) at each end and every one of those four Stabilizers (63) (eight total per PPG) has a removable Claw (67) attached to its underside. Each Claw (67) has twelve Protrusions (87) pointing down from its bottom side so that when the PPG is in its prone working configuration, the Protrusions (87) all penetrate the ground and/or hold on hard surfaces, anchoring the PPG in place during seismic and high wind conditions. The Claw (67) is retained on one end by a welded Channel (90) and a removable Locking Pin (89) on the other end. There are two 0.625" dia.×0.125" raised Claw Locators (88) that assist in maintaining the exact positioning relationship between the Claw (67) and the Stabilizer (63).

The PPG, while standing in its mobile configuration, rides on four Swivel Caster Wheels (54) in order to locate the PPG to a desired location. Two quick release pins that keep the PPG locked in place are removed, allowing the PPG to be opened to a V-shaped configuration. Located on the side of two Base Frame Extrusions (53) are the Diagonal Push-Bars (81) which are attached to the side of two separate Base Frame Extrusions (53) and are each held in place by a Quick Release Pin (82) in at the middle of each Diagonal Push-Bar (81) when not in use. The Diagonal Push-Bars (81) are released by removing the Quick Release Pin (82). One Diagonal Push-Bar (83) is then located with one end on top of the upper Closed Side Hinge (74) located on the right side of the Master Frame Weldment Assembly (35) where it can be locked in place with the previously removed Quick Release Pin (82). The other end of the Diagonal Push Bar (83) is to be located on the top of the Open Side Hinge (73) located on the lower left side of the Master Frame Weldment Assembly (35) where it is locked in place with a previously removed Quick Release Pin (82). If the PPG has to navigate on rough terrain, the second Diagonal Push Bar (83) is to be located on the upper Open Side Hinge (73) located on the left side of the Master Frame Weldment Assembly (35), where it is locked in place with a previously removed Quick Release Pin (82). The other end of the Diagonal Push Bar (83) is to be located on the top of the Closed Side Hinge (74) located on the lower right side of the Master Frame Weldment Assembly (35) where it is to be locked in place with the previously removed Quick Release Pin (82). The PPG can now be quickly and easily moved by one person to its newly required location. When located, the Quick Release Pins (82) are removed and the Diagonal Push-Bars (83) are replaced into their original storage locations and locked back in place with their Quick Release Pins (82).

Master Frame Weldment Assembly (35) retains two 60-Cell Photovoltaic Modules (39). The PPG has two Master Frame Weldment Assemblies (35) hinged together which results in having four 60-Cell Photovoltaic Modules (39) side-by-side when in its open working configuration. Every 60-Cell Photovoltaic Module (39) has two wires from its junction boxes, one Photovoltaic Module Negative Current Source Wire (20) and one Photovoltaic Module Positive Current Source Wire (21). Each Photovoltaic Module Positive Current Source Wire (21) from one 60-Cell Photovoltaic Module (39) connects to a Photovoltaic Module Negative Current Source Wire (20) of the 60-Cell Photovoltaic Module (39) next to it. This results in having a string of four 60-Cell Photovoltaic Modules (39) all connected together in an in-series wiring configuration.

On the underside of the Lower Horizontal Angles (59) are four Support Channel Hinges (51). These Support Channel Hinges (51) have two Support Channels (47) and two Windscreen Stiffeners (46) attached to them. The Support Channels (47) and Windscreen Stiffener (46) are spot-welded to the back side of the Built-in Fold-out Windscreen-Right Side (62) and the Build-in Fold-out Windscreen-Left Side (48). The bottoms of the two Support Channels (47) each have a Plastic Guide Rod (49) with two Sealed Ball Bearings (57) attached, one on each side. Each Plastic Guide Rod (49) with its Sealed Ball Bearings (57) is located inside the Base Frame Extrusion (53). When the Master Frame Weldment Assembly (35) is lifted away from the Base Frame Assembly (70), the result is having the Support Channels (47) pulling its bottom, using the Sealed Ball Bearings (57), back to the end of the Base Frame Extrusion (53) and in doing so, erecting the Built-in Fold-out Windscreen-Left Side (48) and Built-in Fold-out Windscreen-Right Side (62) to their full erected position on the backside of the PPG. And, at the same time, four 60-Cell Photovoltaic Modules (39) are brought up on the front side, of the PPG, at a tilted angle-of-attack to the sun for the face of the 60 Cell Photovoltaic Modules (39).

To facilitate closing of the PPG, the male alignment fixture (76) and the female alignment fixture (77) are used during two closing conditions; when the PPG is in its prone and operational position in the field and needs to be closed and locked with a set of Quick Release Pins (82) in two sections to prepare for relocation and/or temporarily folding shut because of an oncoming hurricane (FIG. 40). Another condition is when the massive PPG is upright in a V-shaped travel configuration and needs to be accurately closed and locked with a set of Quick Release pins (82) to be made ready for transportation (FIG. 39). To achieve these goals quickly and precisely, a set of Male Alignment Fixture (76) and the Female Alignment Fixture (77) have been attached to the three different and demanding locations of the PPG.

When the PPG is in its full open operational configuration, there is a fully erected Built-in Fold-out Windscreen-Left Side (48) and Built-in Fold-out Windscreen-Right Side (62), side-by-side. Each Built-in Fold-out Windscreen-Left Side (48) and Built-in Fold-out Windscreen-Right Side (62) have a Junction Box-Right Side (12) and Junction Box-Left Side (17) mounted on its back side. The Junction Box Cover Plates (11), which have attached Clear Wall-Mount Connector Housings (72), on the front surface of the Built-in Fold-out Windscreen-Left Side (48). The Built-in Fold-out Windscreen-Right Side (62) has a Color-Coded Wall Mount Connector Housing (6). Each Clear Wall-Mount Connector Housing (72) and each Color-Coded Wall-Mount Connector Housing (6) contain a Female 5-Pin Connector (2). Each extreme outside photovoltaic wires on the backside of each outside 60 Cell Photovoltaic Module (39) connects to the Junction Box-Right Side (12) and Junction Box-Left Side (17) located on the backside of the Built-in Fold-out Windscreen-Left Side (48) and Built-in Fold-out Windscreen-Right Side (62). There is also an 5-Conductor Internal Trunk Cable (16) that runs from one Junction Box-Right Side (12) and Junction Box-Left Side (17), both located at the extreme other ends of the opened PPG. The 5-Conductor Internal Trunk Cable (16) carries the current which allows the PPG to produce DC power available on either side of the PPG.

Table 1

Identification of Item Numbers in Drawings

1. Mounting Slot with WEEB-type Washer
2. Female 5-Pin Connector
3. Male 5-Pin Connector
4. Negative Photovoltaic Connector
5. Positive Current Splice to Positive Wire #1 (7)
6. Color-coded Wall Mount Connector Housing
7. Positive Wire #1
8. Positive Wire #2
9. Ground Wire
10. Internal Junction Box Ground Splice to Ground Wire (9)
11. Junction Box Cover Plate
12. Junction Box-Right Side
13. Negative Wire #4
14. Negative Wire #3
15. Ground Wire (9) from Junction Box Cover Plate (11) ?
16. 5-Conductor Internal Trunk Cable
17. Junction Box-Left Side
18. Negative Current Splice to Negative Wire #4 (13)
19. Positive Photovoltaic Connector
20. Photovoltaic Module Negative Current Source Wire
21. Photovoltaic Module Positive Current Source Wire
22. Starter Plug
23. Jumper Wire Loop Connecting Current Between Internal Pin #3 (25) and Internal Pin #4 (24)
24. Internal Pin #4
25. Internal Pin #3
26. External Pin #4
27. External Pin #3
28. External Pin #2
29. External Pin #1
30. Internal Pin #2
31. Internal Pin #1
32. Jumper Wire Loop Connecting Current Between Internal Pin #1 (31) and Internal Pin #2 (30)
33. Photovoltaic Module Positive Current Source Wire (21) Attached to Junction Box-Right Side (12)
34. 5-Conductor Internal Trunk Cable (16) Attached to Junction Box-Right Side (12)
35. Master Frame Weldment Assembly
36. Photovoltaic Module Connection of Negative to Positive In-series Circuitry
37. Photovoltaic Module Negative Current Source Wire (20) Attached to Junction Box-Left Side (17)
38. 5-Conductor Internal Trunk Cable (16) Attached to Junction Box-Left Side (17)
39. Four 60-Cell Photovoltaic Modules Connected In-Series
40. Color-Coded Cable Connector Housing
41. In-Series Wiring Configuration 4-Conductor Trunk Cable
42. In-Parallel Wiring Configuration 3-Conductor Trunk Cable
43. Negative Wire For Pin #4 in Color-Coded Cable Connector Housing (40) Not Used
44. Positive Wire For Pin #1 in Clear Cable Connector Housing (64) Not Used
45. PPG Reference Delineation
46. Windscreen Stiffener
47. Support Channel
48. Built-In Fold-Out Windscreen—Left Side
49. Plastic Guide Rod
50. Formed Kick Channel
51. Support Channel Hinge Bracket
52. Master Frame Weldment Assembly Hinge
53. Base Frame Extrusion
54. Swivel Caster Wheels
55. Quick Release Quick Detachable No-Flat Caster Wheel Assembly
56. Cable Gland
57. Sealed Ball Bearings
58. Upper Horizontal Weldment
59. Lower Horizontal Weldment
60. Right Side Vertical Weldment
61. Left Side Vertical Weldment
62. Built-in Fold-Out Windscreen Right Side
63. Stabilizers
64. Clear Cable Connector Housing
65. Ballast Rack Angles
66. Clevis Pin
67. Claw
68. Lifting Bracket
69. "T" Extrusion
70. Base Frame Assembly
71. Push-Bar
72. Clear Wall-Mount Connector Housing
73. Open Side Hinges
74. Closed Side Hinges
75. Channel End Plate and Caster Wheel Holding Bracket Assembly
76. Male Alignment Fixture
77. Female Alignment Fixture
78. Alignment Fixture Support Angle
79. Diagonal Push Bar in Working Position
80. Directional Engraving
81. Diagonal Push Bar in Stored Position
82. Positive Locking Pin
83. Diagonal Push Bar
84. Alignment Block
85. Interlock Cutout Area
86. Retaining Fixture Cutout Area
87. Claw Protrusions
88. Claw Locators
89. Claw Locating Pin
90. Claw Channel

The invention claimed is:
1. A portable installation of photovoltaic modules, the portable installation comprising:
a plurality of portable power generators, each of the plurality of portable power generators is made in two sections;
each section has a master frame weldment assembly (35);

on an upper horizontal weldment (58) of the master frame weldment assembly is a lifting bracket (68) allowing each of the portable power generator to be relocated from a first location to a second location;

on each side of the lifting bracket is a master frame weldment assembly hinge (52);

each master frame weldment assembly hinge (52) is connected, using an axle bar, to a base frame extrusion (53) of a base frame assembly (70);

wheels (54) are located at the end of the base frame extrusion (53), on the opened side, and are individually attached to a wheel assembly (55);

each base frame extrusion (53) has a stabilizer (63) at each end;

each stabilizer (63) of each base frame assembly (70) has an alignment fixture support angle (78) with an attached male alignment fixture (76) or female alignment fixture (77) configured to receive a complementary male alignment fixture (76) or female alignment fixture (77);

a top-side forward outside corner of a right side vertical weldment (60) has an attached male alignment fixture (76) or female alignment fixture (77) facing inward, and the top-side outside corner of a left side vertical weldment (61) has an attached male alignment fixture (76) or female alignment fixture (77) facing inward so as to facilitate alignment of the two master frame weldment assembly (35) sections when the portable power generator is being closed for transport or storage;

each of the stabilizers (63) has a removable claw (67) attached to its underside;

each removable claw (67) has multiple protrusions from its bottom side so that when the portable power generator is in its open horizontal configuration, the protrusions hold the portable power generator in place on a surface;

two diagonal push-bars (83) which can be locked in place between the right side vertical weldment (60) and the left side vertical weldment (61) by positive locking pins (82), the two diagonal push-bars for holding the portable power generator open in a balanced V-shaped configuration such that the portable power generator can be moved on its wheels (54) in a vertical upright mobile position, wherein each portable power generator comprises two photovoltaic modules, wherein each photovoltaic module comprises a junction box, wherein each junction box comprises two five-pin connectors, wherein, when a plurality of portable power generators is connected electrically in series, at least one five-pin connector of two of the plurality of portable power generators is interconnected with a first trunk cable comprising five conductive wires, and at least one five-pin connector of at least one of the plurality of portable power generators is connected to a starter plug that effectuates a series electrical connection between the plurality of portable power generators, wherein, when the plurality of portable power generators is connected electrically in parallel, at least one five-pin connector of two of the plurality of portable power generators is interconnected with a second trunk cable comprising three conductive wires, and none of the five-pin connectors of any of the plurality of portable power generators connects to a starter plug;

wherein each of the first and second trunk cables is manually detachable from the plurality of portable power generators to allow for the selection or changing of electrical interconnection without additional onsite changes, adjustments, or added parts.

2. The portable installation of photovoltaic modules of claim 1, wherein the male alignment fixture (76) is constructed from a single piece of metal comprising: a flat portion with attachment points for attaching to the master frame weldment assembly (35); a forward portion formed at an upward angle from the flat portion, and having an outward-angled leading-edge portion, the outward-angled leading-edge portion forming an upward-angled contact point with the female alignment fixture (77).

3. The portable installation of photovoltaic modules of claim 1, wherein the female alignment fixture (77) is constructed from a single piece of metal comprising: a flat portion with attachment points for attaching to the master frame weldment assembly (35); a forward portion formed at an upward angle from the flat portion, and having an inward-angled leading-edge portion, the inward-angled leading-edge portion forming an upward-angled contact point with the male alignment fixture (76).

4. The portable installation of photovoltaic modules of claim 1, wherein: each of the two diagonal push-bars (83) has a bottom side surrounded by two side walls, with corresponding cut outs in the side walls (85) such that each push-bar can fit into the other while crossing over the other; each of the two diagonal push-bars (83) have cut outs (86) in the bottom side for receiving a protrusion on the portable power generator for storage of the push bar; and each of the two diagonal push-bars (83) have an alignment block (84) with a negative cylindrical channel formed in the alignment block for receiving the positive locking pins extending from the portable power generator and passing through the push-bar when the push bar is stored on the portable power generator.

5. A method of installing portable power generators, comprising the method steps of:

arranging a plurality of portable power generators, selecting a series or parallel electrical interconnection configuration for the plurality of portable power generators, and connecting together the plurality of portable power generators to accomplish a desired voltage and amperage electrical output, wherein each portable power generator comprises two photovoltaic modules, wherein each photovoltaic module comprises a junction box, wherein each junction box comprises two five-pin connectors, wherein the connecting step comprises, in a series electrical interconnection configuration, a first trunk cable consisting of five conductive wires is connected to at least one junction box of two of the plurality of portable power generators, and at least one junction box of at least one of the plurality of portable power generators is connected to a starter plug that effectuates a series electrical connection between the plurality of portable power generators, wherein the connecting step comprises, in a parallel electrical interconnection configuration, a second trunk cable consisting of three conductive wires is connected to at least one junction box of two of the plurality of portable power generators, and none of the junction boxes of any of the plurality of portable power generators connects to a starter plug, wherein each of the first and second trunk cables is manually detachable from the plurality of portable power generators to allow for the selection or changing of electrical interconnection without additional onsite changes, adjustments, or added parts.

* * * * *